United States Patent
Nakahashi et al.

(10) Patent No.: US 9,987,774 B2
(45) Date of Patent: Jun. 5, 2018

(54) MOLDING APPARATUS, MOLDING APPARATUS UNIT, AND MOLDING METHOD

(71) Applicant: SHARP KABUSHIKI KAISHA, Osaka-shi, Osaka (JP)

(72) Inventors: Takahiro Nakahashi, Osaka (JP); Hiroyuki Hanato, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days. days.

(21) Appl. No.: 15/180,648

(22) Filed: Jun. 13, 2016

(65) Prior Publication Data
US 2016/0297115 A1    Oct. 13, 2016

Related U.S. Application Data

(63) Continuation of application No. 14/353,437, filed as application No. PCT/JP2013/076934 on Oct. 3, 2013, now abandoned.

(30) Foreign Application Priority Data

Oct. 15, 2012 (JP) .................................. 2012-228161

(51) Int. Cl.
*B29C 43/58* (2006.01)
*B29C 43/54* (2006.01)
(Continued)

(52) U.S. Cl.
CPC ............ *B29C 43/54* (2013.01); *B29C 37/005* (2013.01); *B29C 43/58* (2013.01); *B29C 35/02* (2013.01);
(Continued)

(58) Field of Classification Search
CPC ... B29C 43/54; B29C 43/58; B29C 2043/025; B29C 2043/5833; B29C 2043/5816; B29C 37/005
(Continued)

(56) References Cited

U.S. PATENT DOCUMENTS 1,699,120 A    1/1929 Reinhardt
3,920,364 A    11/1975 Cadogan-Rawlinson
(Continued)

FOREIGN PATENT DOCUMENTS

JP    4-179517    6/1992
JP    2005-205844    8/2005
(Continued)

OTHER PUBLICATIONS

International Search Report (Non-English) for PCT/JP2013/076934, dated Jan. 7, 2014.
(Continued)

*Primary Examiner* — Joseph S Del Sole
*Assistant Examiner* — Thu Khanh T Nguyen
(74) *Attorney, Agent, or Firm* — Nixon & Vanderhye P.C.

(57) ABSTRACT

A molding apparatus (1) includes: a servomotor (11) for pressing a resin component (W) by moving an upper mold (MU) in a direction in which the upper mold (MU) is made close to a lower mold (ML); servomotors (12a and 13a) each of which retains X-coordinate and Y-coordinate positions of the lower mold (ML); and a position detection section (41) which determines whether or not the resin component which is sandwiched between the upper mold and the lower mold has been cured, the servomotors each terminating the retention of the lower mold when the resin component has been cured. This makes it possible to obtain a molded product while preventing positional displacement caused by a decrease in volume of a resin which is being cured.

4 Claims, 20 Drawing Sheets

(51) Int. Cl.
*B29C 37/00* (2006.01)
*B29C 35/02* (2006.01)
*B29C 35/08* (2006.01)
*B29C 43/02* (2006.01)

(52) U.S. Cl.
CPC .... *B29C 35/0805* (2013.01); *B29C 2043/025* (2013.01); *B29C 2043/5808* (2013.01); *B29C 2043/5816* (2013.01); *B29C 2043/5833* (2013.01); *B29K 2905/00* (2013.01)

(58) Field of Classification Search
USPC .................................. 425/352–355, 406–423
See application file for complete search history.

(56) References Cited

U.S. PATENT DOCUMENTS

| | | | | |
|---|---|---|---|---|
| 5,324,384 | A | * | 6/1994 | Spengler ................ B29C 63/04 156/227 |
| 5,580,586 | A | | 12/1996 | Yokoyama |
| 7,726,961 | B2 | | 6/2010 | Baltruschat |
| 8,801,414 | B2 | | 8/2014 | Aylmore et al. |
| 2009/0220629 | A1 | * | 9/2009 | Narasimalu ............. B29C 43/36 425/149 |
| 2010/0303948 | A1 | * | 12/2010 | Kato ................... B29C 45/2608 425/416 |

FOREIGN PATENT DOCUMENTS

| | | |
|---|---|---|
| JP | 2007-260791 | 10/2007 |
| JP | 4854357 B2 | 1/2012 |
| JP | 2012-153080 | 8/2012 |

OTHER PUBLICATIONS

Written Opinion of the ISA (Non-English) for PCT/JP2013/076934, dated Jan. 7, 2014.
Restriction Requirement dated Jul. 9, 2015 in U.S. Appl. No. 14/353,437.
Office Action dated Oct. 27, 2015 in U.S. Appl. No. 14/353,437.
Final Office Action dated Mar. 11, 2016 in U.S. Appl. No. 14/353,437.

* cited by examiner (a)

(b)

SILICONE RESIN

| CONDITION | REF | SAM | REACTION RATE |
|---|---|---|---|
| 30-300°C (10°C PER MINUTE) | 146.1J/g | | 100.0% |
| 100°C-2h + 150°C-4h | | 1.1J/g | 99.2% |
| 100°C-2h + 150°C-2h | | 2.6J/g | 98.2% |
| 100°C-2h + 150°C-1h | | 14.1J/g | 90.3% |

MOLDING APPARATUS, MOLDING APPARATUS UNIT, AND MOLDING METHOD

This application is a continuation application of U.S. patent application Ser. No. 14/353,437 filed Apr. 22, 2014, which is the U.S. national phase of International Application No. PCT/JP2013/076934 filed 3 Oct. 2013 which designated the U.S. and claims priority to JP Patent Application No. 2012-228161 filed 15 Oct. 2012, the entire contents of each of which are hereby incorporated by reference.

TECHNICAL FIELD

The present invention relates to a molding apparatus, a molding apparatus unit, and a molding method.

BACKGROUND ART

Conventionally, a molding apparatus has been used which makes it possible to obtain a molded product that is molded by curing a resin by pressing the resin by a mold. According to such a molding apparatus, relative positional displacement occurs between the mold and the molded product during transfer.

A transfer device of Patent Literature 1 includes: a mold holder for holding a transferring mold; a substrate table on which to provide a substrate to be molded and which faces the mold holder; mold holder driving means for moving the mold holder in a direction in which the mold holder is made close to or away from the substrate table; and substrate table moving means for moving the substrate table in a direction which intersects the direction in which the mold holder moves; and a control section for controlling the substrate table moving means. The substrate table moving means is constituted by a linear motor.

According to the transfer device of Patent Literature 1, a positioning target value is set by measuring and adding amounts of relative positional displacement between the substrate table and the mold holder, the relative positional displacement occurring while a substrate provided on the substrate table is being pressed by a mold held by the mold holder.

During a period before the mold holder has a maximum pressing force while pressing the substrate, the control section causes the substrate table moving means to gradually move a position of the substrate table until the position of the substrate table reaches the positioning target value.

This prevents the substrate table moving means from excessively holding the substrate table during transfer, so that a smaller electric current can flow through the substrate table moving means. This prevents heating from the substrate table moving means.

When the mold holder has a maximum pressing force, a molding target layer of the substrate is cured by applying heat or light to a (heat-curable or photo-curable) resin which serves as the molding target layer. Thereafter, a molded substrate is obtained in a case where the mold holder is away from the substrate table.

CITATION LIST

Patent Literatures

Patent Literature 1
Japanese Patent Application Publication, Tokukai, No. 2007-260791 A (Publication Date: Oct. 11, 2007)

Patent Literature 2
Japanese Patent Application Publication, Tokukai, No. 2005-205844 A (Publication Date: Aug. 4, 2005)

SUMMARY OF INVENTION

Technical Problem

However, while the transfer is being carried out, in a case where the molding target layer of the substrate is subjected to a curing reaction by applying thereto heat or light, the molding target layer which is made of the resin has a smaller specific volume as the curing reaction progresses. Therefore, as the curing reaction of the molding target layer progresses, a retaining force for retaining the position of the substrate table increases, so that a residual stress consequently occurs on a molded product. This causes a problem of a decrease in pattern accuracy of the molded product.

The present invention has been made in view of the problem, and an object of the present invention is to obtain a molded product while preventing positional displacement caused by (i) a decrease in volume of a resin which is being cured and (ii) a process for cooling the cured resin.

Solution to Problem

In order to attain the object, a molding apparatus in accordance with an embodiment of the present invention for molding a resin, includes: an upper mold and a lower mold which are paired metal molds and between which the resin is sandwiched while being molded; a first driving section for pressing the resin by moving the upper mold in a first direction in which the upper mold is made close to the lower mold; and a second driving section which retains a position of the lower mold that is movable in a second direction which intersects the first direction, the second driving section terminating the retention of the position of the lower mold before the resin which is sandwiched between the upper mold and the lower mold is mold-released.

In order to attain the object, a method in accordance with an embodiment of the present invention for molding a resin, the resin being sandwiched between an upper mold and a lower mold which are paired metal molds, the method includes: pressing the resin by moving the upper mold in a first direction in which the upper mold is made close to the lower mold; retaining a position of the lower mold that is movable in a second direction which intersects the first direction; and terminating the retention of the position of the lower mold before the resin which is sandwiched between the upper mold and the lower mold is mold-released.

Advantageous Effects of Invention

An embodiment of the present invention yields an effect of obtaining a molded product while preventing positional displacement caused by a reduction in volume of a resin which is being cured.

DESCRIPTION OF EMBODIMENTS

First Embodiment (Configuration of Molding Apparatus 1)

Figure 1:
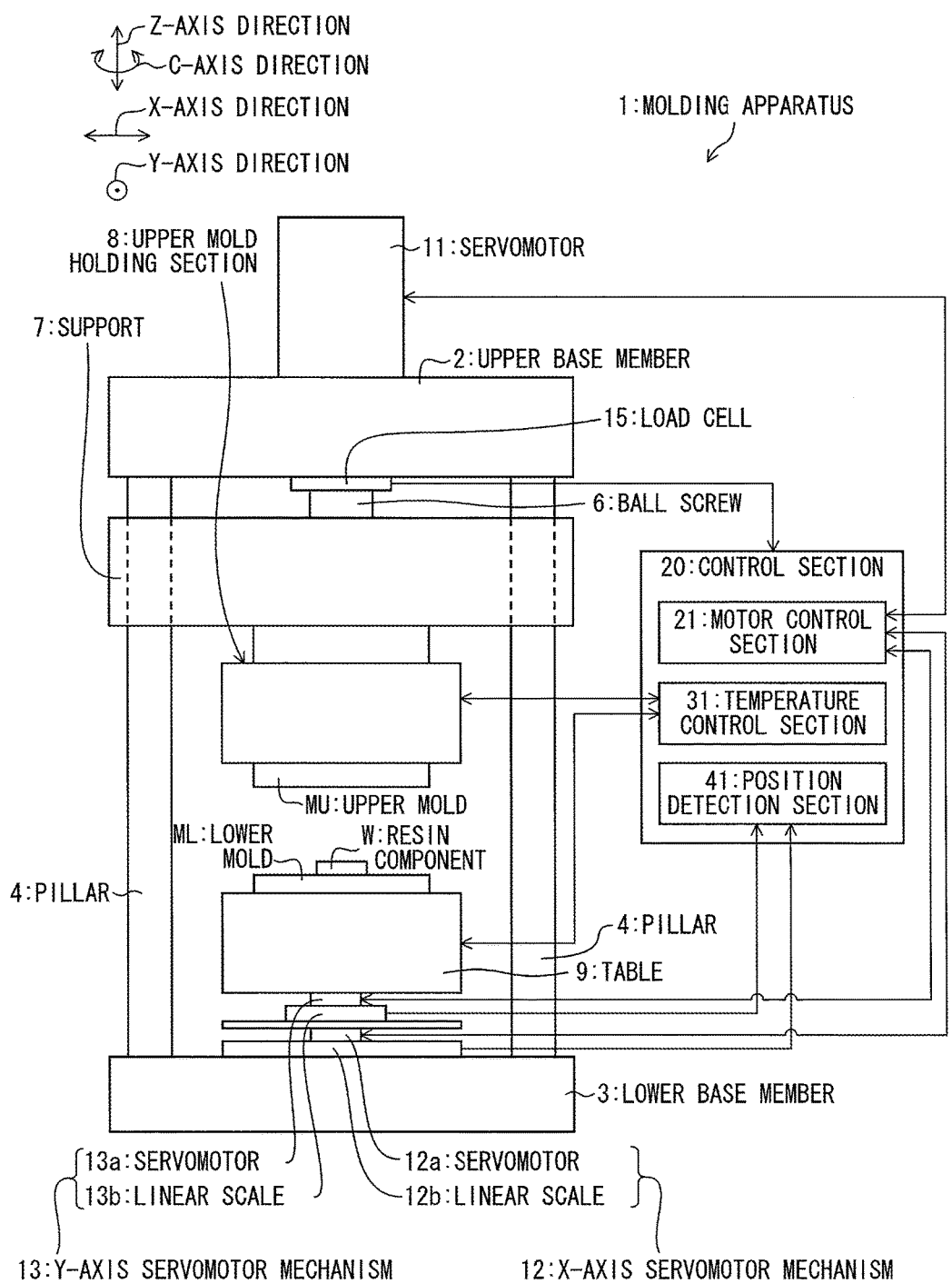
FIG. 1 illustrates a configuration of a molding apparatus in accordance with a first embodiment.

A configuration of a molding apparatus 1 is described below with reference to FIG. 1. FIG. 1 illustrates a configuration of the molding apparatus 1 in accordance with the present embodiment.

The molding apparatus 1 has an X-axis, a Y-axis, and a Z-axis which orthogonally intersect each other, and a C axis which is a rotation axis. A Z-axis direction is an upward and downward direction (vertical direction), and is orthogonal to each of the X-axis, the Y-axis, and the C-axis. A vertically downward direction of the Z-axis direction is a first direction. A direction in which the X-axis and the Y-axis each extend so as to be orthogonal to the Z-axis is a second direction. That is, X-axis and Y-axis directions are not only horizontal directions but also rectilinear directions which are orthogonal to each other. A C-axis direction is not only a horizontal direction but also a rotation direction. The X-axis extends in a transverse direction of FIG. 1, and the Y-axis extends in a direction which is orthogonal to the X-axis.

The molding apparatus 1 includes: an upper base member 2; a lower base member 3 which is provided so as to be lower than the upper base member 2; a plurality of pillars 4 which connect the upper base member 2 and the lower base member 3; a support 7 which is provided so as to move up and down; an upper mold holding section 8 which is provided so as to face a surface of the support 7 which surface faces the lower base member 3; and a table 9 which is provided so as to face a surface of the lower base member 3 which surface faces the support 7.

The molding apparatus 1 further includes: a ball screw 6 and a servomotor (first driving section) 11 which are provided so as to move the support 7 and the upper mold holding section 8 in the Z-axis direction; an X-axis servomotor mechanism 12 and a Y-axis servomotor mechanism 13 for moving the table 9 in the respective X-axis and Y-axis directions; a load cell 15; and a control section 20. The table 9 moves not only in the X-axis and Y-axis directions but also in the C-axis direction. The molding apparatus 1 further includes a C-axis moving mechanism (not illustrated) for moving the table 9 in the C-axis direction.

The control section 20 includes a motor control section 21, a temperature control section 31, and a position detection section (curing determination section) 41.

The motor control section 21 controls driving of the servomotor 11 and respective servomotors of the X-axis servomotor mechanism 12 and the Y-axis servomotor mechanism 13, and controls the movement of the table 9 in the C-axis direction. The temperature control section 31 is a control section for carrying out temperature control with respect to an upper mold MU and a lower mold ML. The position detection section 41 obtains X-coordinate and Y-coordinate positions of the table 9 from respective linear scales of the X-axis servomotor mechanism 12 and the Y-axis servomotor mechanism 13.

The upper mold MU and the lower mold ML are paired metal molds. The molding apparatus 1 molds a resin component W in a state in which the resin component W is sandwiched between the upper mold MU and the lower mold ML.

The upper mold MU is provided on a surface of the upper mold holding section 8 which surface faces the table 9. The lower mold ML is provided on a surface of the table 9 which surface faces the upper mold holding section 8.

The upper mold MU and the lower mold ML are metal molds for molding a resin. The upper mold MU and the lower mold ML are paired so as to mold the resin component W in a state in which the resin component W is sandwiched between the upper mold MU and the lower mold ML, the resin component W being a molding target product which is provided between the upper mold MU and the lower mold ML.

The resin component W contains a heat-curable or photo-curable resin material.

The plurality of pillars 4, which are provided on the lower base member 3 while extending in the Z-axis direction, support the upper base member 2. The plurality of pillars 4 are provided so as to connect respective corners of the lower base member 3 and the upper base member 2 which corners face each other, and the total number of the plurality of pillars 4 is, for example, four. Note that the number of the plurality of pillars 4 is not particularly limited to four provided that the number is large enough to support the upper base member 2.

The servomotor 11 and the ball screw 6 are driving sections for moving the support 7 and the upper mold holding section 8 in the Z-axis direction. The servomotor 11 is instructed by the motor control section 21 to be driven to rotate the ball screw 6. For example, the servomotor 11 is provided on an upper surface of the upper base member 2. While extending in the Z-axis direction, the ball screw 6 is provided so as to be lower than the upper base member 2 and to be located directly on the upper base member 2 or below the upper base member 2 via the load cell 15.

The support 7 supports the upper mold holding section 8 from above. The plurality of pillars 4 are provided so as to be through respective four corners of the support 7. The ball screw 6 is provided in an interior of the support 7 by being inserted from the upper surface side of the support 7. In a case where the ball screw 6 rotates, the support 7 moves up and down in a direction in which the ball screw 6 extends, i.e., in the Z-axis direction.

In accordance with the movement of the support 7 in the Z-axis direction, the upper mold holding section 8 and the upper mold MU also move in the Z-axis direction.

The upper mold holding section 8 holds the upper mold MU from above. The upper mold holding section 8 includes a heat source and a temperature sensor (which are not illustrated). The upper mold holding section 8 is instructed by the temperature control section 31 to transmit heat of the heat source to the upper mold MU by raising a temperature of the heat source. According to this, in a case where the resin component W is a heat-curable resin, the resin component W is heat-cured. Further, the upper mold holding section 8 is instructed by the temperature control section 31 to supply, to the temperature control section 31, temperature information on the upper mold MU which temperature information has been detected by the temperature sensor.

Note that, in a case where the resin component W is not a heat-curable resin but a photo-curable resin, it is only necessary that the upper mold holding section 8 include a light source for curing a photo-curable resin. In this case, the upper mold holding section 8 does not need to include the heat source and the temperature sensor.

The load cell 15 detects a pressing force for pressing the resin component W by the upper mold MU, and supplies, to the control section 20, information indicative of the detected pressing force. The load cell 15 is provided on, for example, a lower surface of the upper base member 2 (a surface of the upper base member 2 which surface faces the support 7).

The table 9 moves in the X-axis direction, the Y-axis direction, and the C-axis direction. The lower mold ML is provided on an upper surface of the table 9 (a surface of the table 9 which surface faces the upper mold holding section 8). The table 9 includes a heat source and a temperature sensor (which are not illustrated).

The table 9 is instructed by the temperature control section 31 to transmit heat of the heat source of the table 9 to the lower mold ML by raising a temperature of that heat source. According to this, in a case where the resin component W is a heat-curable resin, the resin component W is heat-cured. Further, the table 9 is instructed by the temperature control section 31 to supply, to the temperature control section 31, temperature information on the lower mold ML which temperature information has been detected by the temperature sensor of the table 9.

Note that, in a case where the resin component W is not a heat-curable resin but a photo-curable resin, the table 9 does not need to include the heat source and the temperature sensor.

The X-axis servomotor mechanism 12 and the Y-axis servomotor mechanism 13 are provided so as to be lower than the table 9 and to be located between the table 9 and the lower base member 3. Either one of the X-axis servomotor mechanism 12 and the Y-axis servomotor mechanism 13 may be provided so as to be upper or lower than the other of the X-axis servomotor mechanism 12 and the Y-axis servomotor mechanism 13. For example, it is assumed that the X-axis servomotor mechanism 12 is provided so as to be lower than the Y-axis servomotor mechanism 13, i.e., the Y-axis servomotor mechanism 13 is provided so as to be upper than the X-axis servomotor mechanism 12.

The X-axis servomotor mechanism 12 is a driving section for moving the table 9 and the lower mold ML in the X-axis direction by being instructed by the motor control section 21. The X-axis servomotor mechanism 12 includes a servomotor 12a and an X-axis linear scale 12b. The X-axis linear scale 12b makes it possible to detect an X-axis position of the table 9. The X-axis linear scale 12b supplies, to the position detection section 41, information indicative of the detected X-axis position of the table 9.

The Y-axis servomotor mechanism 13 is a driving section for moving the table 9 and the lower mold ML in the Y-axis direction by being instructed by the motor control section 21. The Y-axis servomotor mechanism 13 includes a servomotor 13a and a Y-axis linear scale 13b. The Y-axis linear scale 13b makes it possible to detect a Y-axis position of the table 9. The Y-axis linear scale 13b supplies, to the position detection section 41, information indicative of the detected Y-axis position of the table 9.

The control section 20 is a control section for controlling driving of the driving sections of the molding apparatus 1.

The motor control section 21 is a controller for controlling driving of the servomotor 11, the respective servomotors 12a and 13b of the X-axis servomotor mechanism 12 and the Y-axis servomotor mechanism 13, and the C-axis moving mechanism. By applying an electric current to each of the servomotors 11, 12a, and 13b, the motor control section 21 drives the servomotors 12a and 13b and fixes the X, Y, and Z axes.

By driving the servomotor 11, the motor control section 21 lowers the support 7, the upper mold holding section 8, and the upper mold MU in the Z-axis direction. The motor control section 21 lowers the upper mold MU in the Z-axis direction until the control section 20 obtains, from the load cell 15, information that the pressing force has reached a given value. When the motor control section 21 obtains, from the load cell 15, the information that the pressing force has reached a given value, the motor control section 21 terminates the lowering of the upper mold MU and fixes the upper mold MU at a position at which the lowering of the upper mold MU is terminated.

Further, the motor control section 21 adjusts the X-coordinate and Y-coordinate positions of the table 9 by controlling driving of the servomotors 12a and 13a. The motor control section 21 thus adjusts relative positions of the upper mold MU and the lower mold ML. In a case where the relative positions of the upper mold MU and the lower mold ML coincide with each other, the motor control section 21 applies a retaining force to the table 9 by applying a given electric current to each of the servomotors 12a and 13a. This fixes the X-coordinate and Y-coordinate positions of the table 9.

When the motor control section 21 which is carrying out a molding process obtains, from the position detection section 41, information that a curing point of the resin component W has been detected, the motor control section 21 terminates an output of an electric current to be applied to each of the servomotors 12a and 13a, and releases a retaining force for retaining the table 9 on the X and Y axes. That is, the motor control section 21 causes the servomotors 12a and 13a to be in a servo-free state.

The temperature control section 31 controls respective temperatures of the upper mold MU and the lower mold ML by controlling driving of the heat sources (not illustrated) provided in the upper mold holding section 8 and the table 9, respectively. The temperature control section 31 obtains, from the temperature sensors provided in the upper mold holding section 8 and the table 9, respectively, the temperature information on each of the upper mold MU and the lower mold ML.

The position detection section 41 obtains, at regular time intervals, the X-coordinate position of the table 9 by obtaining information from the linear scale 12b, and obtains, at regular time intervals, the Y-coordinate position of the table 9 by obtaining information from the linear scale 13b.

As described later with reference to FIG. 7, in a period in which curing of the resin component W progresses during molding and then the resin component W reaches a point in a vicinity of its curing point, the table 9 has a smaller moving amount per unit time than in the other period.

By observing the moving amount per unit time of the table 9 during the molding, the position detection section 41 detects the curing point which precedes a point at which the resin component W is mold-released.

A method for detecting the curing point of the resin component W by observing the moving amount per unit time of the table 9 during the molding is exemplified by various methods. For example, by determining, from the X-coordinate and Y-coordinate positions obtained per unit time from the respective linear scales 12b and 13b, that a moving amount per unit time of the X-coordinate and Y-coordinate positions of the table 9 is not more than a predetermined value and that moving amount has been repeatedly obtained a predetermined number of times, the position detection section 41 determines that the resin component W has reached the curing point.

When the position detection section 41 determines that the resin component W has reached the curing point, the position detection section 41 supplies, to the motor control section 21, information that the curing point of the resin component W has been detected.

(Overview of Operation of Molding Apparatus 1)

Next, an overview of an operation carried out by the molding apparatus 1 is described below with reference to FIG. 2.

Figure 2:
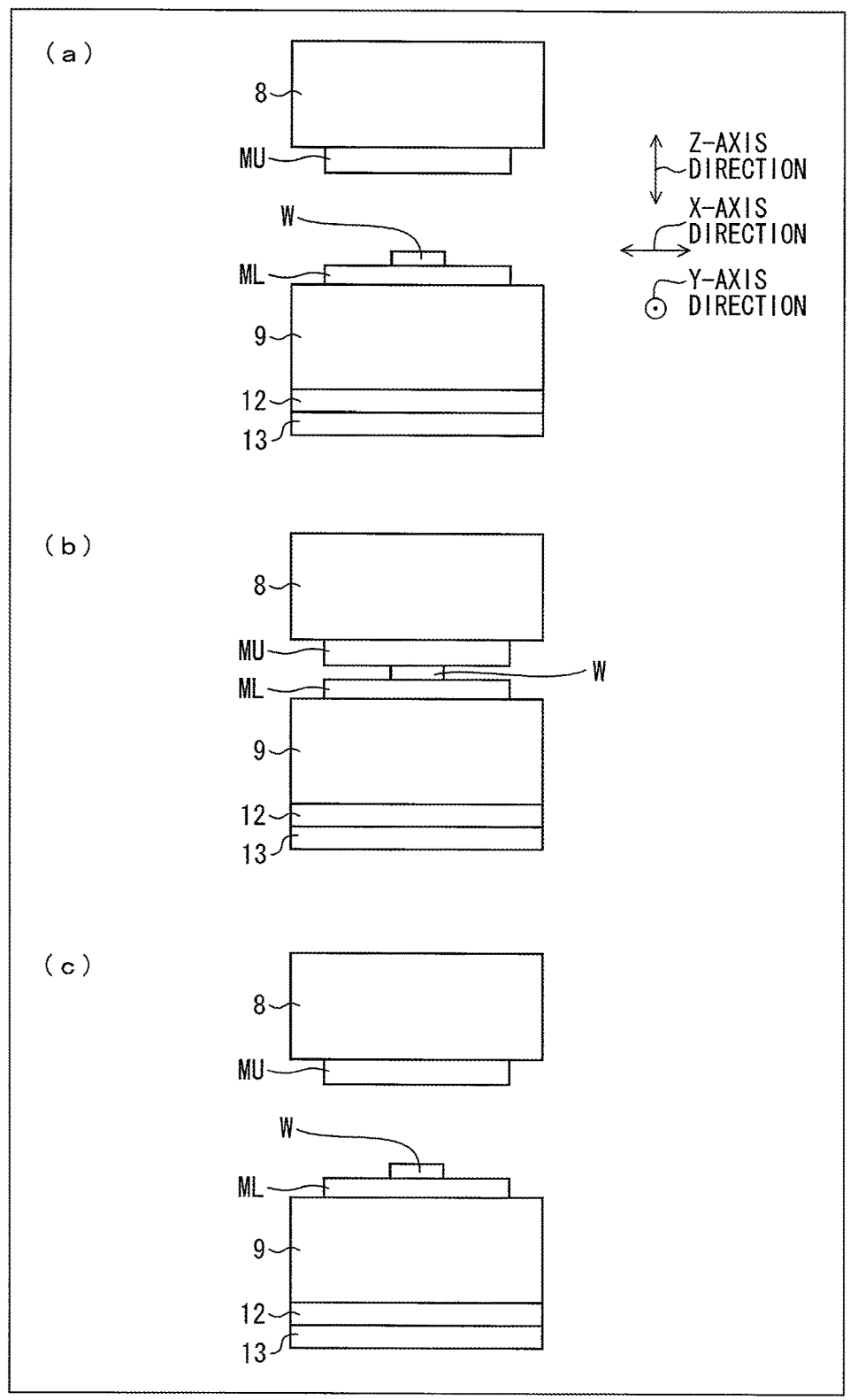
FIG. 2 illustrates a molding operation carried out by the molding apparatus in accordance with the first embodiment.

FIG. 2 illustrates a molding operation carried out by the molding apparatus 1. As illustrated in (a) of FIG. 2, the resin component W which is a molding target member is provided, by, for example, being applied, on the lower mold ML provided on the table 9.

Then, as illustrated in (b) of FIG. 2, in a case where the motor control section 21 lowers the upper mold holding section 8 in the Z-axis direction, the upper mold MU and the resin component W are brought into contact with each other, so that the resin component W is sandwiched between the upper mold MU and the lower mold ML. In this case, the upper mold holding section 8 and the upper mold MU each of which receives a force from the servomotor 11 apply a given pressing force in the vertically downward direction to the resin component W. Meanwhile, in order to prevent the table 9 and the lower mold ML from moving in X and Y directions, the X-axis servomotor mechanism 12 and the Y-axis servomotor mechanism 13 apply, to the table 9 and the lower mold ML, a retaining force for fixing positions of the table 9 and the lower mold ML.

When the upper mold MU has a given pressing force in the vertically downward direction, the upper mold MU and the lower mold ML are heated by the temperature control section 31, and the respective temperatures of the upper mold MU and the lower mold ML are increased to be not less than a temperature at which the resin component W is cured. This starts curing of the resin component W.

Note that, in a case where the resin component W is not heat-curable but photo-curable, the resin component W is irradiated with light for curing.

When the position detection section 41 detects the curing point of the resin component W after a curing reaction of the resin component W has progressed by heat or light, the motor control section 21 releases a retaining force of the servomotors 12a and 13a for moving the table 9 in the X-axis and Y-axis directions (causes the servomotors 12a and 13a to be in a servo-free state).

This is because a specific volume of the resin component W starts decreasing in a case where the resin component W starts gelling in the upper mold MU and the lower mold ML, so that a cure shrinkage occurs in the resin component W. In a case where curing of the resin component W adhering to each of the upper mold MU and the lower mold ML progresses by the cure shrinkage, internal distortion of the resin component W occurs in respective interiors of the upper mold MU and the lower mold ML. Progress of the cure shrinkage by the progress of the curing of the resin component W causes a retaining force for retaining the X-coordinate and Y-coordinate positions of the table 9 to be ineffective, so that the adhering resin component is released from the internal distortion. Then, the relative positions of the upper mold MU and the lower mold ML are shifted. Therefore, the molding apparatus 1 causes the X and Y axes of the table 9 to be in a servo-free state before the adhering resin component is released from the internal distortion (before the resin component reaches a mold release point).

According to this, the lower mold ML on the table 9 from which the retaining force has been released follows the upper mold MU by a pressing force of the upper mold holding section 8 in the vertical direction. This prevents relative positional displacement between the lower mold ML and the upper mold MU, and allows an increase in accuracy per unit area of an optical functional surface of the resin component W which has been molded (described later).

A timing at which to cause the X and Y axes of the table 9 to be in a servo-free state is determined in accordance with a change in specific volume of the resin component W which is being molded, i.e., in accordance with a PVT characteristic.

Thereafter, in a case where the motor control section 21 drives the servomotor 11, the upper mold holding section 8 and the upper mold MU are moved in a vertically upward direction (see (c) of FIG. 2). This completes the resin component W which has been molded, so that the completed resin component W can be taken out.

Figure 3:
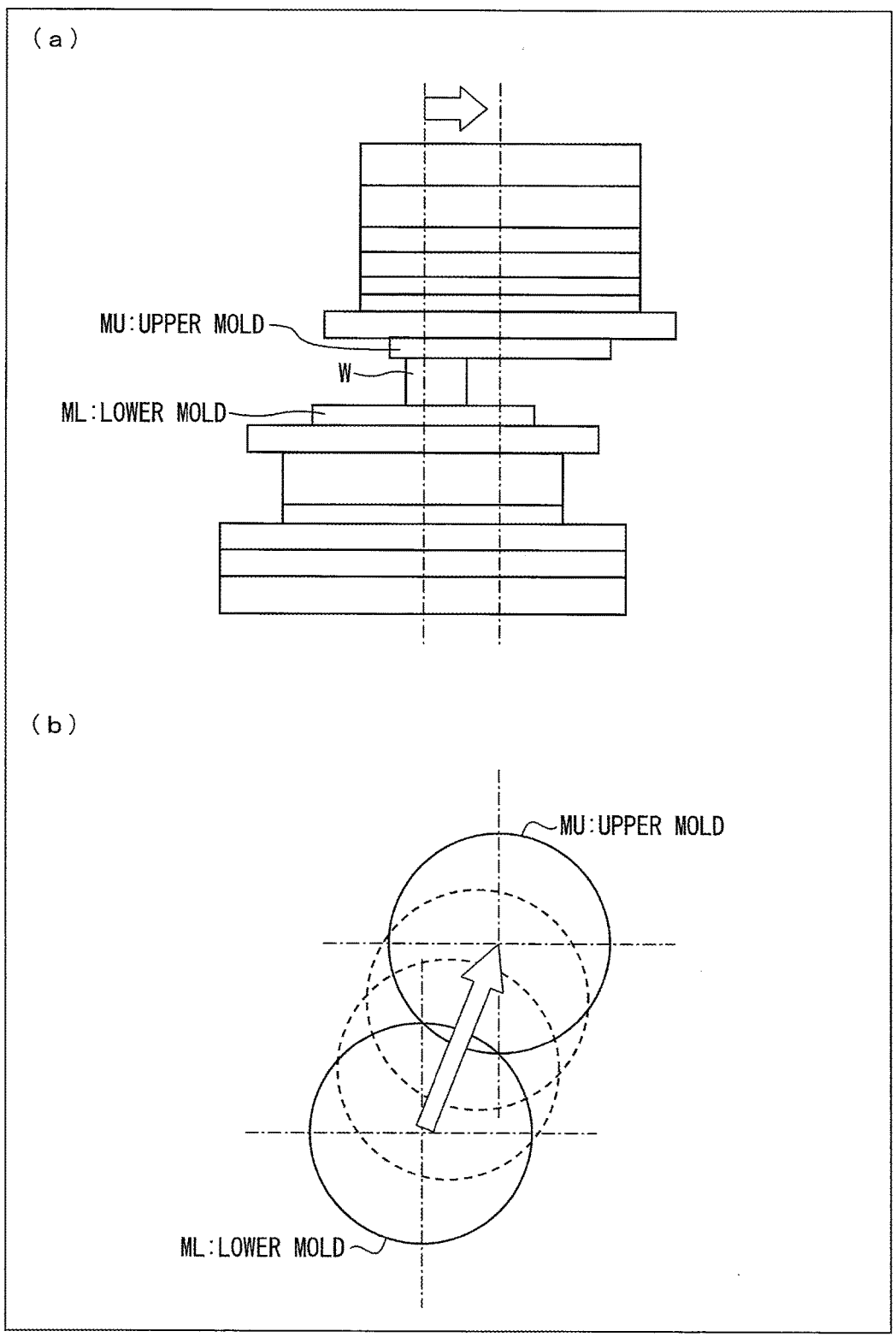
FIG. 3 illustrates how X-Y relative positions of an upper mold and a lower mold of the molding apparatus are shifted.

FIG. 3 illustrates how X-Y relative positions of the upper mold MU and the lower mold ML are shifted. (a) of FIG. 3 is a side view illustrating how the upper mold MU and the lower mold ML are displaced, and (b) of FIG. 3 is a plan view illustrating how the upper mold MU and the lower mold ML are displaced.

Figure 4:
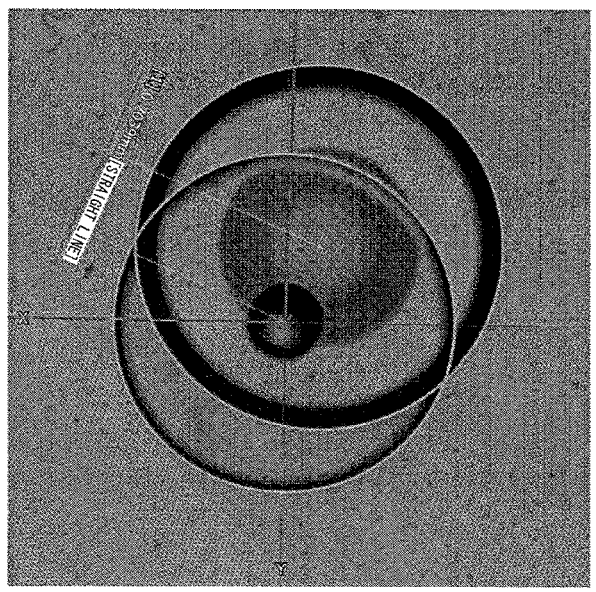
FIG. 4 has plan views each illustrating the X-Y relative positions of the upper mold and the lower mold of the molding apparatus.
Figure 4:
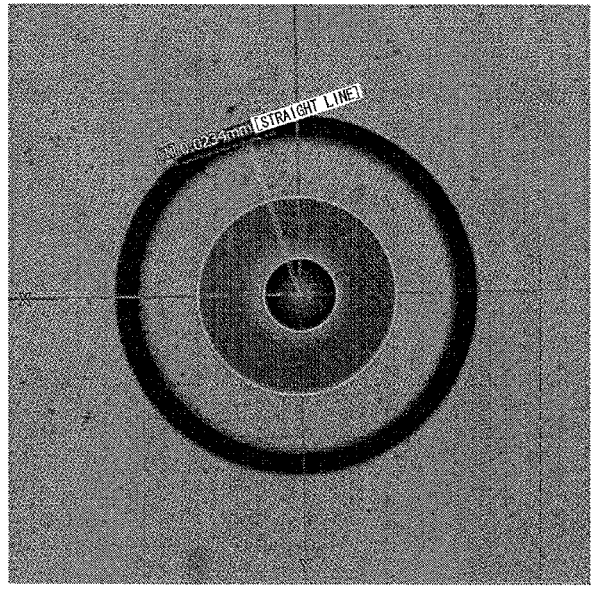

FIG. 4 has plan views each illustrating the X-Y relative positions of the upper mold MU and the lower mold ML. (a) of FIG. 4 illustrates how the X-Y relative positions of the upper mold MU and the lower mold ML are shifted, and (b)

of FIG. 4 illustrates a state in which no X-Y relative positional displacement occurs between the upper mold MU and the lower mold ML.

According to an experimental result described later, it is revealed that, in a case where a retaining force in the X-axis and Y-axis directions of the table 9 is maintained until the curing of the resin component W progresses and thus the resin component W adhering to each of the upper mold MU and the lower mold ML is released from the internal distortion caused by that resin component W (until the resin component W reaches the mold release point), large relative positional displacement in the X and Y directions occurs between the upper mold MU and the lower mold ML (see (a) and (b) of FIG. 3, and (a) of FIG. 4).

Therefore, by causing the servomotors 12a and 13a to be in a servo-free state in a period between the curing point indicating that the resin component W which is being molded has been cured and the mold release point, the molding apparatus 1 prevents application of the retaining force for retaining the X-coordinate and Y-coordinate positions of the table 9 after the resin component W has been cured. This makes it possible to complete molding of the resin component W in a state in which no X-Y relative positional displacement occurs between the upper mold MU and the lower mold ML (see (b) of FIG. 4).

(PVT Characteristic)

Figure 5:
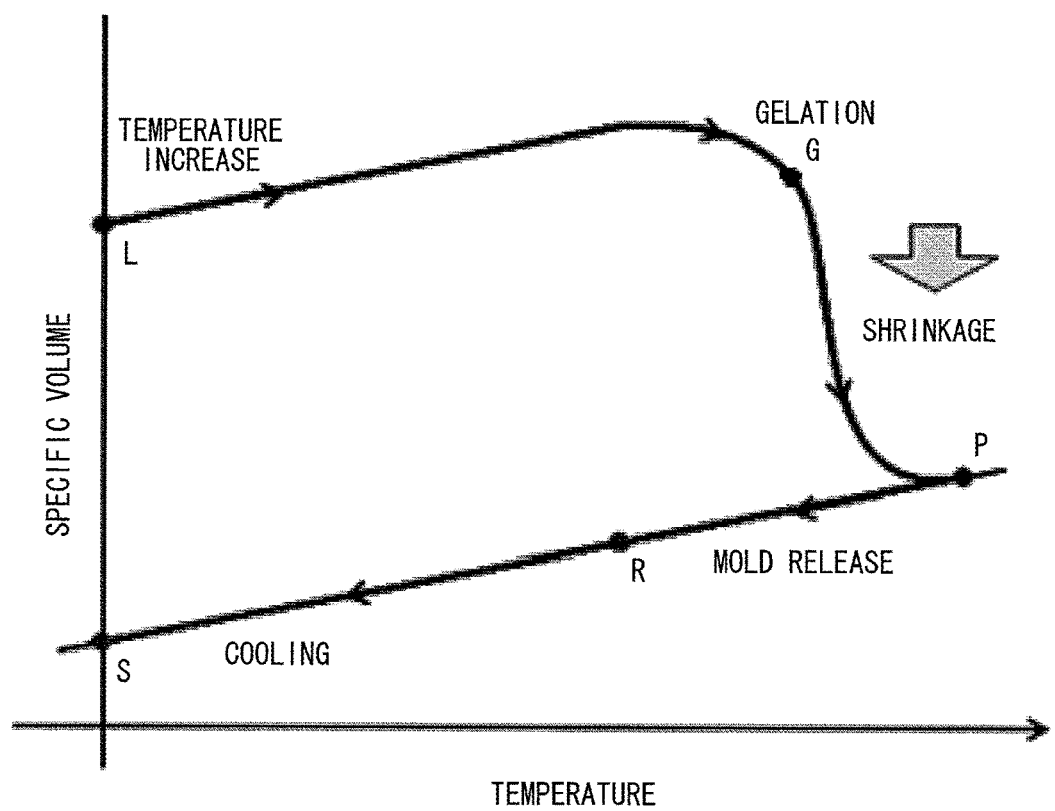
FIG. 5 has graphs each showing a PVT characteristic.

Next, the PVT characteristic is described below with reference to FIG. 5. FIG. 5 has graphs each showing the PVT characteristic. In FIG. 5, the horizontal axis shows a temperature, and the vertical axis shows a specific volume.

The PVT characteristic refers to a correlation among a pressure (P), a specific volume (V), and a temperature (T). In accordance with a model of the PVT characteristic, a process for molding the resin component W is roughly divided into four processes as shown in FIG. 5. The following description discusses the four processes.

(i) From Point L Indicating Initial State to Gelation Point G

After the upper mold MU is lowered, the resin component W is sandwiched between the upper mold MU and the lower mold ML, and the upper mold MU has a maximum pressing force, the respective temperatures of the upper mold MU and the lower mold ML are increased. Then, the resin component W is thermally expanded in accordance with the increase in temperature. Subsequently, a cure shrinkage caused by a curing reaction prior to gelation occurs in the resin component W just before a gelation point G.

(ii) From Gelation Point G to Curing Point P

In a case where the resin component W is further increased in temperature from the gelation point G, the resin component W adheres to each of the respective interiors of the upper mold MU and the lower mold ML, so that a change in size of the resin component W in an in-plane direction is restricted. Further, the resin component W is subjected to a rapid cure shrinkage caused by the curing reaction.

(iii) Curing Point P

The cure shrinkage caused by the curing reaction of the resin component W is terminated in accordance with a curing time, so that stress relaxation occurs. At a curing point P, heat curing of the resin component W has been substantially completed. Therefore, in a case where the resin component W has reached the curing point P, heating of the upper mold MU and the lower mold ML is terminated. This causes the resin component W to be subjected to a cooling process on and after the curing point P.

(iv) From Curing Point P to Mold Release Point R

The resin component W has a lower specific volume on and after the curing point P in accordance with cooling. However, since the resin component W adheres to each of the respective interiors of the upper mold MU and the lower mold ML, the change in size of the resin component W is restricted by the upper mold MU and the lower mold ML.

(v) From Mold Release Point R to Molding Completion Point S

Further, since the resin component W is being cooled, a rapid change in size of the resin component W occurs. When the resin component W reaches a mold release point R, by releasing a stress remaining in the resin component W, the resin component W is separated from each of the respective interiors of the upper mold MU and the lower mold ML to each of which interiors the resin component W has adhered. Then, the resin component W is further cured by being cooled. When the resin component W has a temperature that is equal to that obtained at a point L which indicates an initial state, it can be considered that the resin component W has reached a molding completion point S. When the resin component W reaches the molding completion point S, molding of the resin component W is completed, and the upper mold holding section 8 is raised so as to separate the upper mold MU from the resin component W. This makes it possible to obtain the resin component W which has been molded.

A difference between a size of the resin component W which size is obtained at the molding completion point S and a size of the upper mold MU and the lower mold ML is the cure shrinkage in the resin component W.

(X-Coordinate and Y-Coordinate Positions)

Figure 6:
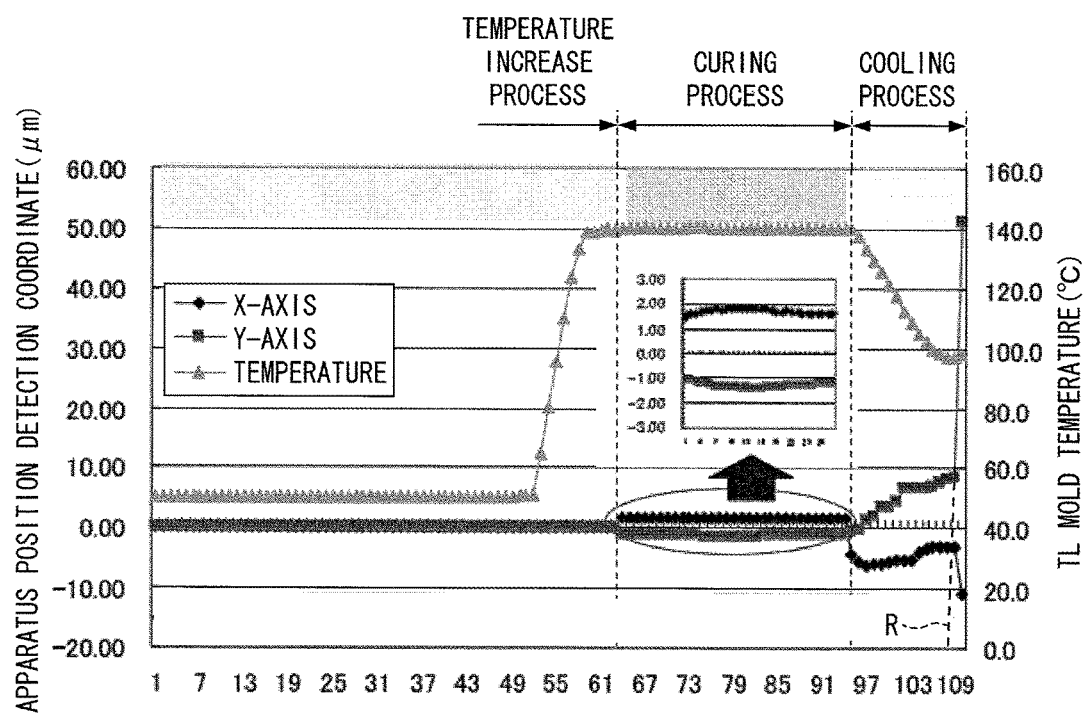
FIG. 6 shows how (i) X and Y coordinates of a table and (ii) respective temperatures of the upper mold and the lower mold are changed during a process for molding a resin component.

FIG. 6 shows how (i) X and Y coordinates of the table 9 and (ii) the respective temperatures of the upper mold MU and the lower mold ML are changed during a process for molding the resin component W.

In graphs of FIG. 6, "X-AXIS" shows an X-axis coordinate position of the table 9, "Y-AXIS" shows a Y-axis coordinate position of the table 9, and "TEMPERATURE" shows the respective temperatures of the upper mold MU and the lower mold ML.

That is, the X-axis coordinate position in FIG. 6 is X-axis positional information which is obtained by the position detection section 41 from the linear scale 12b, and the Y-axis coordinate position in FIG. 6 is Y-axis positional information which is obtained by the position detection section 41 from the linear scale 13b. Further, information on the "temperature" in FIG. 6 is temperature information on each of the upper mold MU and the lower mold ML which temperature information is obtained by the temperature control section 31 from each of the upper mold holding section 8 and the table 9.

First, the respective temperatures of the upper mold MU and the lower mold ML are increased by a temperature increase process (see FIG. 6). Then, for example, the respective temperatures of the upper mold MU and the lower mold ML are maintained to be constant at a temperature of approximately 140° C.

Subsequently, a curing process starts at the point L, and the resin component W starts to be cured.

As shown in FIG. 6, it is revealed that, at a time when the curing of the resin component W is started, the table 9 is slightly positionally displaced in an X positive direction and a Y negative direction.

Then, the curing of the resin component W is completed, and heating of the upper mold MU and the lower mold ML is terminated at the curing point P. This causes the resin component W to be subjected to the cooling process. Subsequently, the resin component W has a smaller specific volume.

Thereafter, it is revealed that there is a point at which X-axis and Y-axis positions of the table 9 are greatly changed. The point at which the X-axis and Y-axis positions of the table 9 are greatly changed is the mold release point R.

Figure 7:
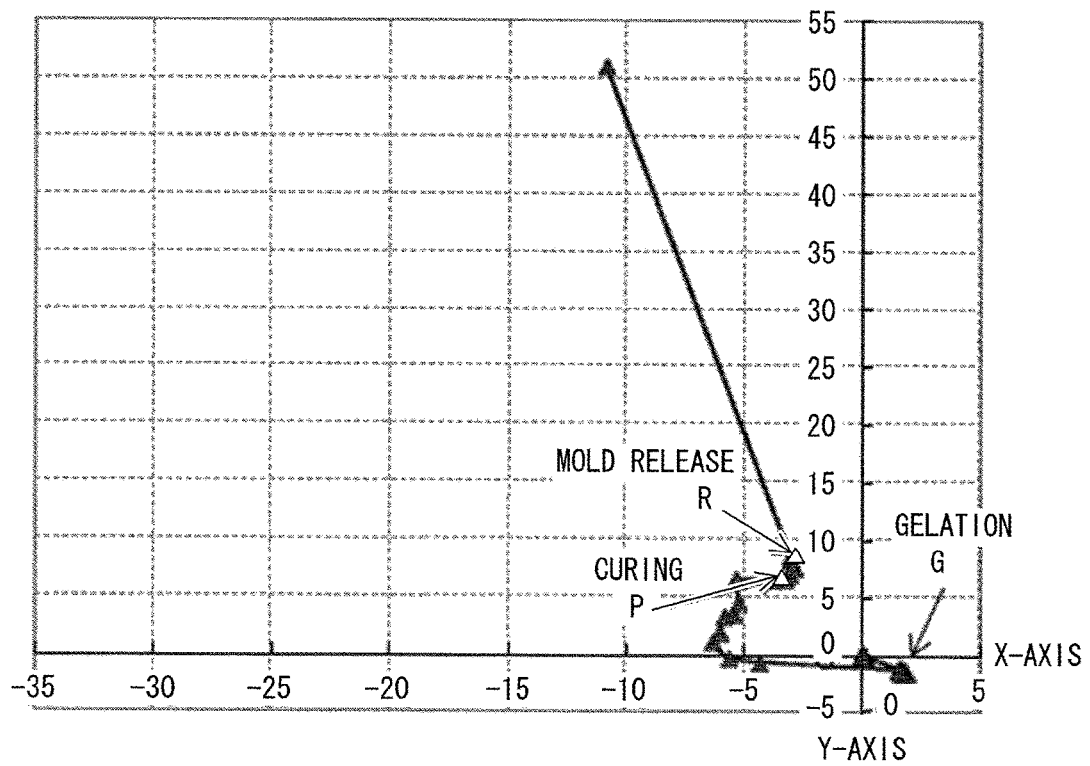
FIG. 7 is obtained by plotting, at regular time intervals, the change in the X and Y coordinates of the table during the process for molding the resin component.

FIG. 7 is obtained by plotting, at regular time intervals, the change in the X and Y coordinates of the table 9 during the process for molding the resin component W.

In FIG. 7, the horizontal axis shows the X-axis coordinate position of the table 9, and the vertical axis shows the Y-axis coordinate position of the table 9.

That is, the X-axis coordinate position in FIG. 7 is the X-axis positional information which is obtained by the position detection section 41 from the linear scale 12*b*, and the Y-axis coordinate position in FIG. 7 is the Y-axis positional information which is obtained by the position detection section 41 from the linear scale 13*b*.

As shown in FIG. 7, the X-coordinate and Y-coordinate positions of the table 9 slightly move in a vicinity of the origin from the origin which indicates the initial state. Then, in a vicinity of the curing point P, a moving amount of the X-coordinate and Y-coordinate positions of the table 9 which move per unit time is smaller than in the other period, and the X-coordinate and Y-coordinate positions of the table 9 are substantially constant. Subsequently, when the resin component W reaches the mold release point R, the X-coordinate and Y-coordinate positions of the table 9 greatly move in an X negative direction and a Y positive direction.

As described earlier, it is revealed that a moving amount per unit time of the X-coordinate and Y-coordinate positions of the table 9 has a minimum value in the vicinity of the curing point P after the start of the curing of the resin component W and then has a maximum value after the mold release point R.

Therefore, in a case where the moving amount per unit time of the X-coordinate and Y-coordinate positions of the table 9 is observed, it is possible to understand a curing state of the resin component W.

(Flow of Process Carried Out by Molding Apparatus 1)

Figure 8:
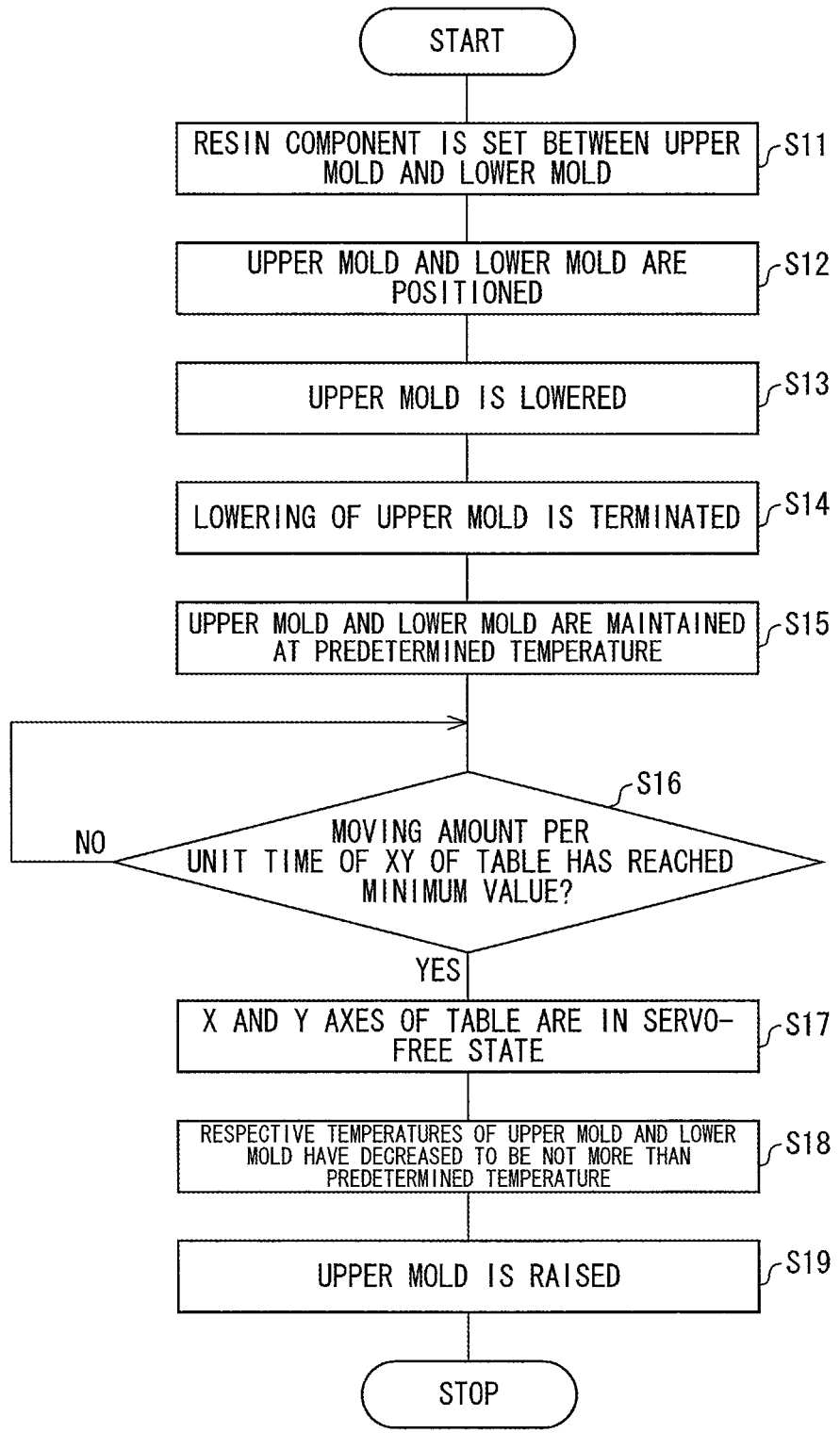
FIG. 8 shows a flow of a process carried out by the molding apparatus.

Next, a flow of a process carried out by the molding apparatus 1 is described below with reference to, for example, FIG. 8. FIG. 8 shows the flow of the process carried out by the molding apparatus 1.

The resin component W which is a molding target product is provided, by, for example, being applied, on the lower mold ML of the upper mold MU and the lower mold ML which are separated from each other. The resin component W is thus set between the upper mold MU and the lower mold ML which are separated from each other (step S11).

Then, the motor control section 21 controls driving of the servomotors so that positions of the upper mold MU and the lower mold ML coincide with each other. This adjusts a position of the table 9 on the X, Y, and C axes, so that the positions of the upper mold MU and the lower mold ML are adjusted (step S12).

In a case where the positions of the upper mold MU and the lower mold ML coincide with each other, in order to fix the position of the table 9, the motor control section 21 applies a retaining force to the table 9 by applying a given electric current to each of the servomotors 12*a* and 13*a*.

Next, the motor control section 21 drives the servomotor 11 so as to rotate the motor the ball screw 6, and lowers the upper mold holding section 8 so as to lower the upper mold MU (step S13).

Then, in a case where the upper mold MU is brought into contact with the resin component W and the resin component W is sandwiched between the upper mold MU and the lower mold ML, a pressing force supplied from the load cell 15 to the control section 20 has a higher value. In a case where the pressing force obtained from the load cell 15 has reached a given value, the motor control section 21 terminates the driving of the servomotor 11. This terminates the lowering of the upper mold MU (step S14).

In this case, in order to fix a position of the upper mold MU in the Z-axis direction, the motor control section 21 applies a given electric current to the servomotor 11. This fixes the position of the upper mold MU in the Z-axis direction and applies a given pressing force to each of the resin component W and the lower mold ML.

Next, the temperature control section 31 heats the upper mold MU and the lower mold ML by driving the respective heat sources of the upper mold holding section 8 and the table 9. When the temperature control section 31 obtains temperature information from each of respective heaters of the upper mold holding section 8 and the table 9 and a temperature indicated by the temperature information reaches a predetermined constant temperature, the temperature control section 31 controls driving of the respective heat sources of the upper mold holding section 8 and the table 9 so that the upper mold MU and the lower mold ML have the predetermined constant temperature. The upper mold MU and the lower mold ML are thus heated to and maintained at the predetermined constant temperature (step S15).

Then, curing of the resin component W which is sandwiched between the upper mold MU and the lower mold ML progresses, so that the position detection section 41 determines whether or not the resin component W has reached the curing point P.

That is, for example, by determining, from the X-coordinate and Y-coordinate positions obtained per unit time from the respective linear scales 12*b* and 13*b*, whether or not a moving amount per unit time of the X-coordinate and Y-coordinate positions of the table 9 is not more than a predetermined value and that moving amount has been repeatedly obtained a predetermined number of times, the position detection section 41 determines whether or not the moving amount per unit time of the table 9 has reached a minimum value (step S16).

When the position detection section 41 determines that the moving amount per unit time of the table 9 has reached a minimum value (YES at step S16), the position detection section 41 supplies, to the motor control section 21, information that the curing point has been detected. When the motor control section 21 detects, from the position detection section 41, the information that the curing point has been detected, the motor control section 21 releases the retaining force of the servomotors 12*a* and 13*a* so as to cause the X and Y axes of the table 9 to be in a servo-free state (step S17).

When the temperature control section 31 finds that the respective temperatures of the upper mold MU and the lower mold ML have decreased to be not more than a predetermined temperature (step S18), the motor control section 21 raises the upper mold MU by raising the upper mold holding section 8 by controlling the driving of the servomotor 11 (step S19).

This completes the resin component W which has been molded, so that the completed resin component W can be taken out of the upper mold MU and the lower mold ML.

As described earlier, the molding apparatus 1 includes: the servomotor 11 for pressing the resin component W by moving the upper mold MU in a Y-axis downward direction in which the upper mold MU is made close to the lower mold ML; and the servomotors 12a and 13a each of which retains a position of the lower mold ML that is movable in the X-axis and Y-axis directions each of which intersects the Y-axis downward direction. This makes it possible to cure the resin component W while fixing the relative positions of the upper mold MU and the lower mold ML.

The molding apparatus 1 further includes the position detection section 41 which determines whether or not the resin component W which is sandwiched between the upper mold MU and the lower mold ML has been cured.

For example, by determining, from the X-coordinate and Y-coordinate positions obtained per unit time from the respective linear scales 12b and 13b, by determining, from the X-coordinate and Y-coordinate positions obtained per unit time from the respective linear scales 12b and 13b, whether or not a moving amount per unit time of the X-coordinate and Y-coordinate positions of the table 9 is not more than a predetermined value and that moving amount has been repeatedly obtained a predetermined number of times, the position detection section 41 determines whether or not the moving amount per unit time of the table 9 has reached a minimum value (see step S16).

Then, by determining that the moving amount per unit time of the table 9 has reached a minimum value, the position detection section 41 determines that the resin component W has been cured, and supplies, to the motor control section 21, information that the curing point which precedes a point at which the resin component W is mold-released has been detected.

Subsequently, when the motor control section 21 obtains, from the position detection section 41, the information that the curing point has been detected, the motor control section 21 terminates retention of the position of the table 9 on the X and Y axes by causing the servomotors 12a and 13a to be in a free state.

This allows the lower mold ML to move in the X-axis and Y-axis directions, so that the lower mold ML follows X and Y positions of the upper mold MU by a pressing force of the upper mold MU in a Z-axis downward direction even in a case where a decrease in volume of the resin component W which is being cured may occur. This makes it possible to obtain a molded product while preventing positional displacement caused by a decrease in volume of the resin component W which is being cured.

That is, a highly accurate molded product can be obtained by reducing (i) a load on the molding apparatus 1, i.e., on driving axes (X and Y axes) of the molding apparatus 1 and (ii) a residual stress on a molded product.

Figure 9:
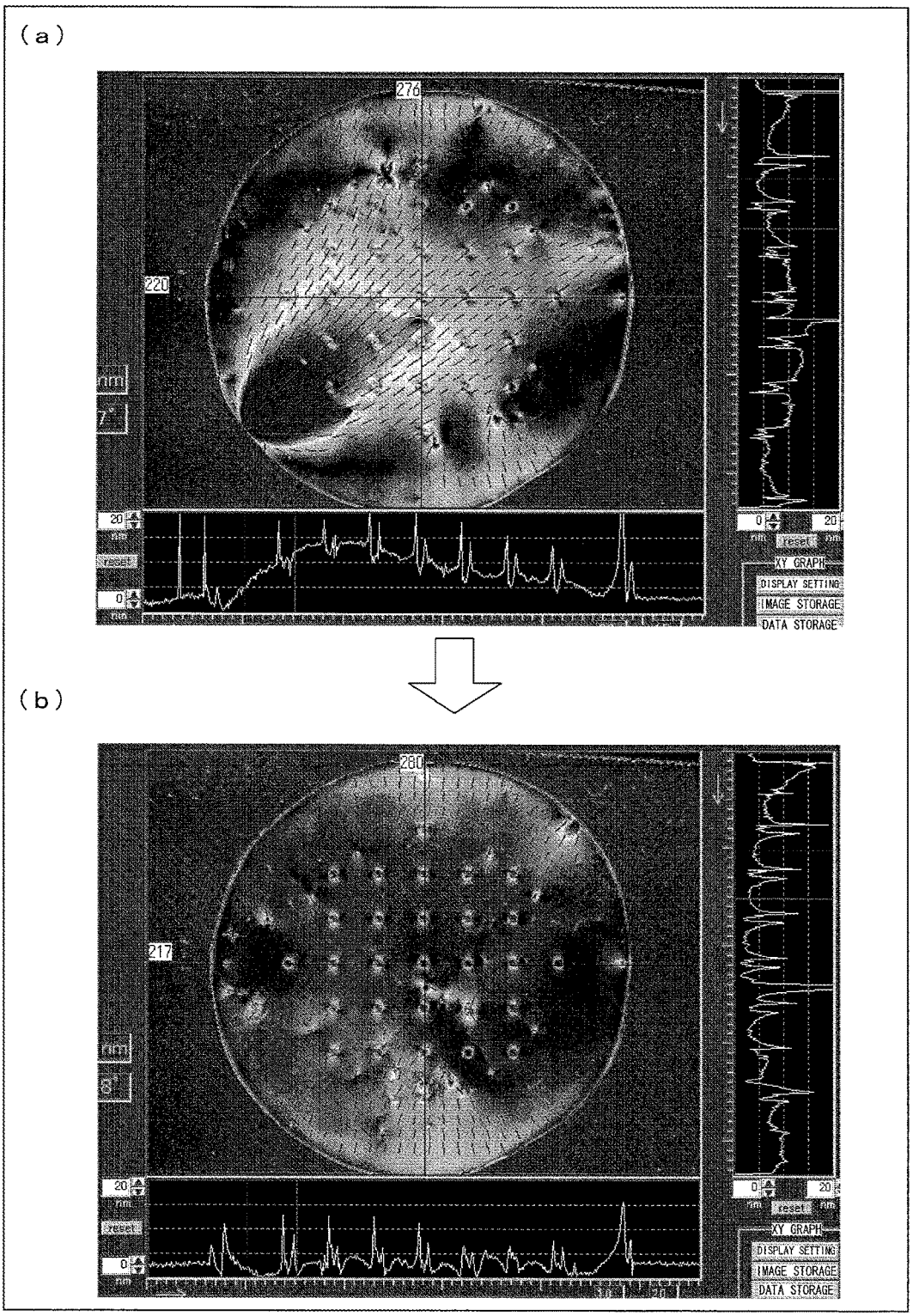
FIG. 9 shows a film thickness of a surface of a resin component which has been molded by the molding apparatus.

FIG. 9 shows a film thickness of a surface of the resin component W which has been molded. (a) of FIG. 9 shows the film thickness of the surface of the resin component W in a case where the molding apparatus 1 is in no servo-free state, and (b) of FIG. 9 shows the film thickness of the surface of the resin component W in a case where the molding apparatus 1 is in a servo-free state as described in the present embodiment. It is revealed that the film thickness of the surface of the resin component W less varies and is more uniform in (b) of FIG. 9 than in (a) of FIG. 9.

Figure 10:
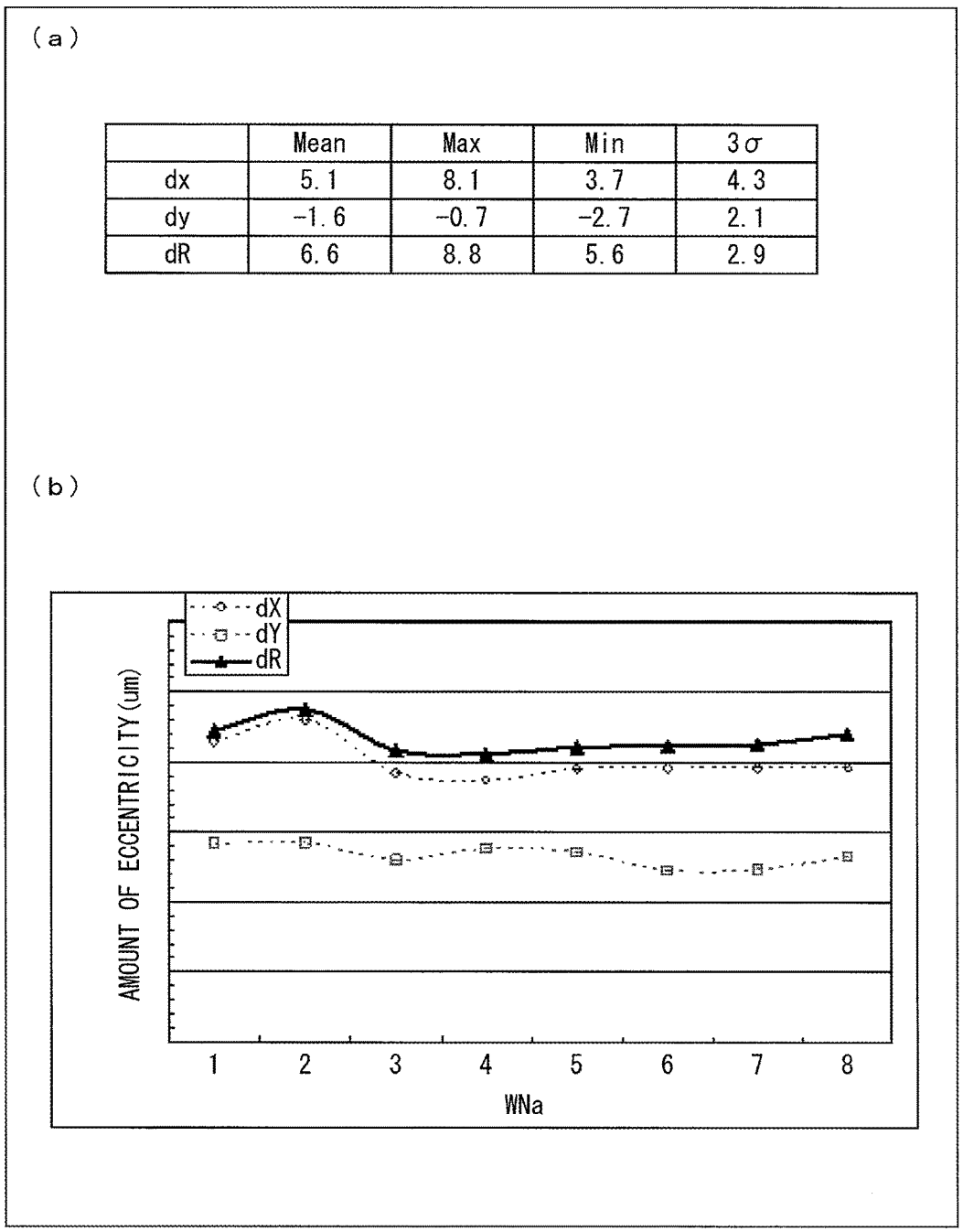
FIG. 10 shows a variation in film thickness of a surface among a plurality of resin components in a case where the molding apparatus is in no servo-free state.

FIG. 10 shows a variation in film thickness of a surface among a plurality of resin components in a case where the molding apparatus 1 is in no servo-free state. (a) of FIG. 10 is a table showing the variation in film thickness of the surface among the plurality of resin components, and (b) of FIG. 10 is a graph showing the variation in film thickness of the surface among the plurality of resin components.

Figure 11:
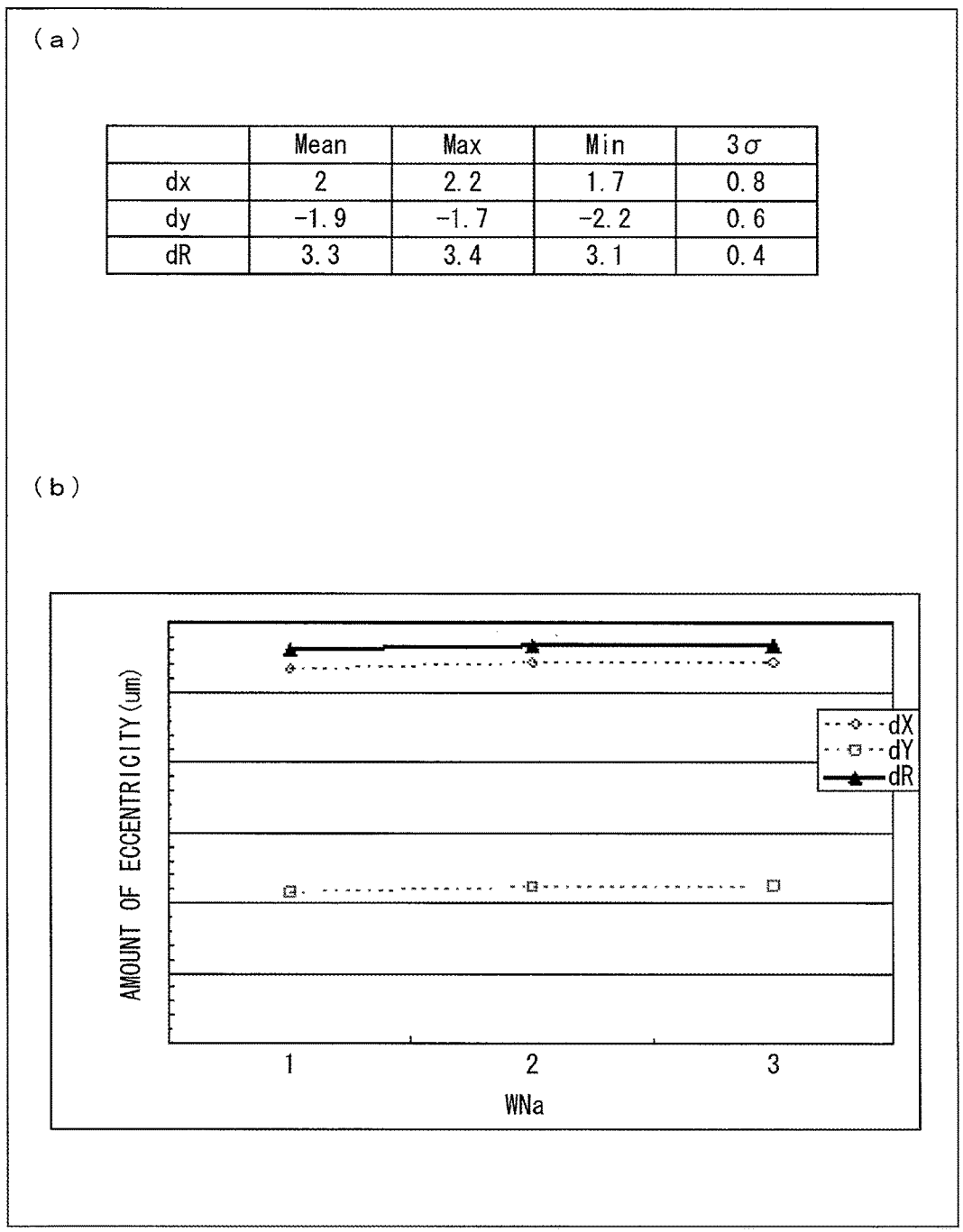
FIG. 11 shows a variation in film thickness of a surface among a plurality of resin components in a case where the molding apparatus is in a servo-free state.

FIG. 11 shows a variation in film thickness of a surface among a plurality of resin components in a case where the molding apparatus 1 is in a servo-free state as described in the present embodiment. (a) of FIG. 11 is a table showing the variation in film thickness of the surface among the plurality of resin components, and (b) of FIG. 11 is a graph showing the variation in film thickness of the surface among the plurality of resin components.

In each of (b) of FIG. 10 and (b) of FIG. 11, the horizontal axis shows a wafer number, and the vertical axis shows an amount of eccentricity.

According to FIGS. 10 and 11, it is revealed that, in a case where the molding apparatus 1 is in a servo-free state at step S16, a narrower variation occurs in film thickness of the resin component W.

Second Embodiment

Next, a second embodiment of the present invention is described below with reference to FIGS. 12 through 14, and 20. Note that, for convenience, members having functions identical to those of the respective members illustrated in the drawings of the First Embodiment are given respective identical reference numerals, and a description of those members is omitted here.

Figure 12:
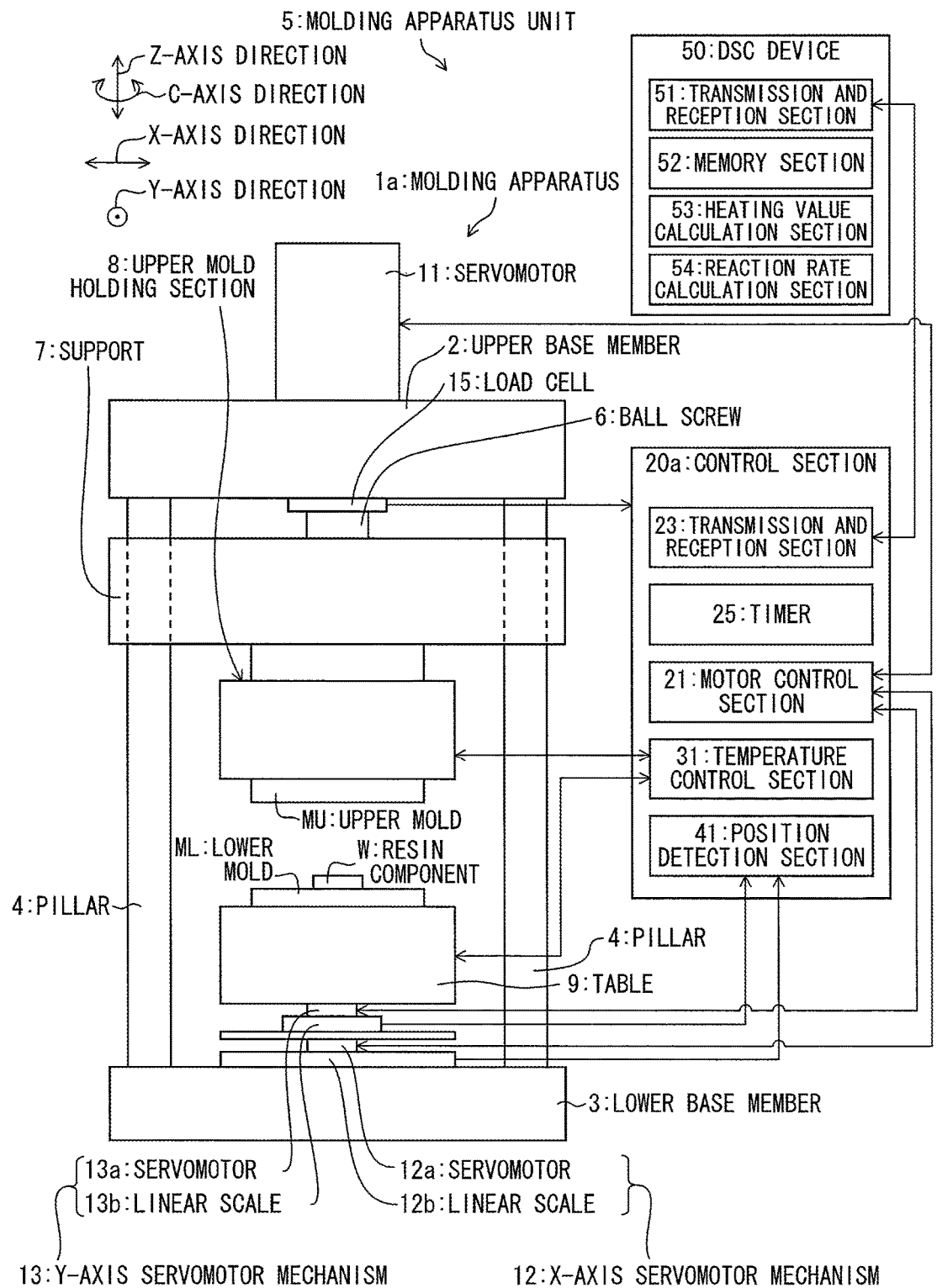
FIG. 12 illustrates a configuration of a molding apparatus in accordance with a second embodiment.

FIG. 12 illustrates a configuration of a molding apparatus unit 5 in accordance with the second embodiment. The molding apparatus unit 5 includes a molding apparatus 1a and a DSC (differential scanning calorimetry) device 50.

The molding apparatus 1a differs from the molding apparatus 1 in that the molding apparatus 1a includes a control section 20a instead of the control section 20 of the molding apparatus 1. The other configuration of the molding apparatus 1a is similar to that of the molding apparatus 1.

The control section 20a is obtained by causing the control section 20 to include a transmission and reception section 23 and a timer 25. The other configuration of the control section 20a is similar to that of the control section 20. That is, the control section 20a includes a motor control section 21, the transmission and reception section 23, the timer 25, a temperature control section 31, and a position detection section 41.

The DSC device 50 includes a transmission and reception section 51, a memory section 52, a heating value calculation section 53, and a reaction rate calculation section (curing determination section) 54.

The timer 25 starts time counting at a time when the temperature control section 31 starts heating respective heat sources of an upper mold holding section 8 and a table 9. Then, the timer 25 supplies, to the transmission and reception section 23, an elapsed time having elapsed from the start of time counting.

The temperature control section 31 supplies, to the transmission and reception section 23, temperature information obtained from each of an upper mold MU and a lower mold ML.

The transmission and reception section 23 functions as an interface with the DSC device 50. The transmission and reception section 23 is online connected with the transmission and reception section 51 which serves as an interface section of the DSC device 50. Note that the transmission and reception section 23 and the transmission and reception section 51 may be connected either by wire or wirelessly.

The transmission and reception section 23 supplies, to the transmission and reception section 51 of the DS device 50, (i) the elapsed time obtained from the timer 25 and (ii) the information obtained from the temperature control section 31. Further, when the transmission and reception section 23 obtains servo-free instruction information supplied from the transmission and reception section 51 of the DSC device 50, the transmission and reception section 23 supplies the obtained servo-free instruction information to the motor control section 21.

When the motor control section 21 obtains the servo-free instruction information from the transmission and reception section 23, the motor control section 21 terminates an output of an electric current to be applied to each of servomotors 12a and 13a, and releases a retaining force for retaining the table 9 on X and Y axes. That is, the motor control section 21 causes the servomotors 12a and 13a to be in a servo-free state.

In order to observe a curing state of a resin component W which is being molded by the molding apparatus 1a, the DSC device 50 finds a heating value of the resin component W and calculates a reaction rate of the resin component W. That is, by calculating the reaction rate, the DSC device 50 detects a curing point which precedes a point at which the resin component W is mold-released.

The transmission and reception section 51 functions as an interface with the control section 20a. When the transmission and reception section 51 obtains servo-free instruction information from the reaction rate calculation section 54, the transmission and reception section 51 supplies the obtained servo-free instruction information to the transmission and reception section 23. Further, when the transmission and reception section 51 obtains the elapsed time and the temperature information from the transmission and reception section 23, the transmission and reception section 51 supplies the obtained elapsed time and the obtained temperature information to the heating value calculation section 53.

In the memory section 52, a heating value which is necessary for a resin material of the resin component W to be cured (such a heating value is referred to as a heating value REF) is stored in advance. The heating value REF stored in the reaction rate calculation section 23 is measured in advance by use of, for example, the DSC device 50. The heating value REF is a heating value at which the resin material of the resin component W is considered to be sufficiently cured and which is obtained before the resin component W is mold-released from the upper mold MU and the lower mold ML.

The heating value calculation section 53 which has obtained the elapsed time and the temperature information each supplied from the transmission and reception section 51 calculates in real time, in accordance with the obtained elapsed time and the obtained temperature information, a heating value of the resin component W which is being molded (such a heating value is referred to as a heating value SAM). The heating value calculation section 53 supplies the calculated heating value SAM to the reaction rate calculation section 54.

The reaction rate calculation section 53 determines whether or not the resin material of the resin component W which is being molded has been cured. The reaction rate calculation section 53 determines, by finding that a heating value of a resin of the resin component W which is sandwiched between the upper mold MU and the lower mold ML has exceeded a predetermined value, that the resin material of the resin component W which is being molded has been cured.

That is, in accordance with the heating value SAM calculated by the heating value calculation section 53 and the heating value REF stored in the memory section 52, the reaction rate calculation section 53 calculates a reaction rate of the resin component W which is being molded. The reaction rate calculation section 23 finds the reaction rate based on the following (Equation 1):

$$\text{(Reaction rate)} = (1 - (\text{heating value } SAM)/(\text{heating value } REF)) \times 100 \quad \text{(Equation 1)}$$

When the resin component W has a reaction rate of not less than 80%, the reaction rate calculation section 53 considers that the resin component W has been cured, and supplies, to the transmission and reception section 51, the servo-free instruction information which is information that the curing point has been detected.

Figure 13:
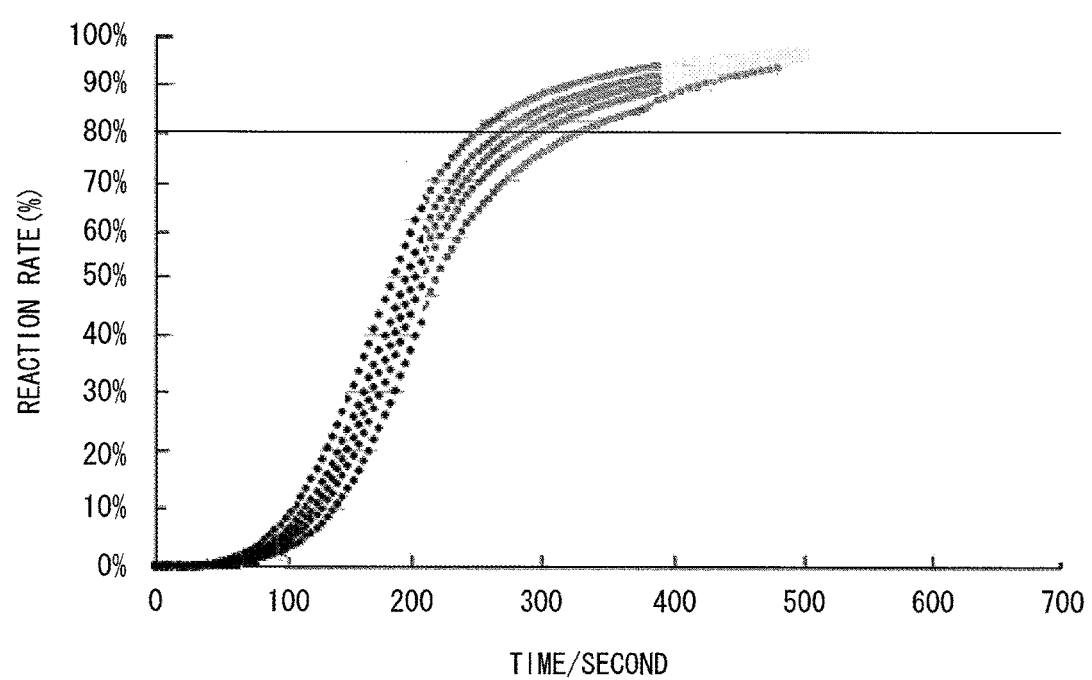
FIG. 13 shows a relationship between a heating time and a reaction rate of a resin component which is being molded by the molding apparatus.

FIG. 13 shows a relationship between a time having elapsed from the start of the heating of the resin component W and a reaction rate of the resin component W. In FIG. 13, the horizontal axis shows a time having elapsed since the temperature control section 31 started heating the upper mold MU and the lower mold ML, and the vertical axis shows the reaction rate.

Figures 20, 21:
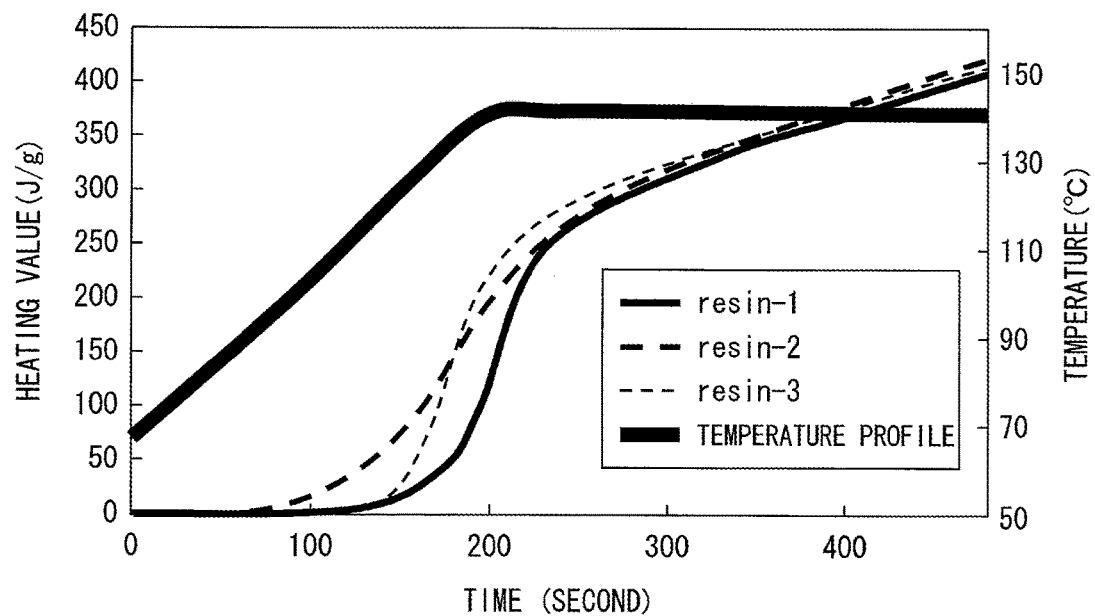
FIG. 20 shows a heating behavior calculated by a DSC device.
FIG. 21 shows a relationship between a molding condition and a reaction rate of a silicone resin.

FIG. 20 shows a heating behavior calculated by the DSC device. FIG. 20 shows a relationship between (a) a temperature profile applied to the upper mold MU and the lower mold ML and (b) an elapsed time and a temperature, and a heating value for several resin materials (a "resin-1", a "resin-2", and a "resin-3").

FIG. 21 shows an example of a condition under which a silicone resin has a reaction rate of not less than 80% while being molded. FIG. 21 shows a relationship between a molding condition and a reaction rate of a silicone resin.

In FIG. 21, "CONDITION" indicates (i) a temperature to be applied during molding and (ii) a time, "REF" indicates the heating value REF (described earlier), "SAM" indicates the heating value SAM (described earlier), and "REACTION RATE" indicates the reaction rate (described earlier).

As shown in FIG. 21, in a case where a silicone resin is molded under a condition under which the silicone resin is changed from 30° C. to 300° C. in increments of 10° C. per minute, the silicone resin has a heating value REF of 146.1 [J/g]. The heating value REF of 146.1 [J/g] is a heating value which is sufficient enough to consider that the silicone resin has been totally cured.

In a case where the silicone resin is molded under a heat condition of 2 h (hours) at 100° C.+4 h (hours) at 150° C., the silicone resin has a heating value SAM of 1.1 [J/g]. In a case where the heating value SAM is applied to Equation 1 (described earlier), the silicone resin has a reaction rate of 90.3%.

In a case where the silicone resin is molded under a heat condition of 2 h (hours) at 100° C.+2 h (hours) at 150° C., the silicone resin has a heating value SAM of 2.6 [J/g]. In a case where the heating value SAM is applied to Equation 1 (described earlier), the silicone resin has a reaction rate of 98.2%.

In a case where the silicone resin is molded under a heat condition of 2 h (hours) at 100° C.+1 h (hour) at 150° C., the silicone resin has a heating value SAM of 14.1 [J/g]. In a case where the heating value SAM is applied to Equation 1 (described earlier), the silicone resin has a reaction rate of 90.3%.

Figure 14:
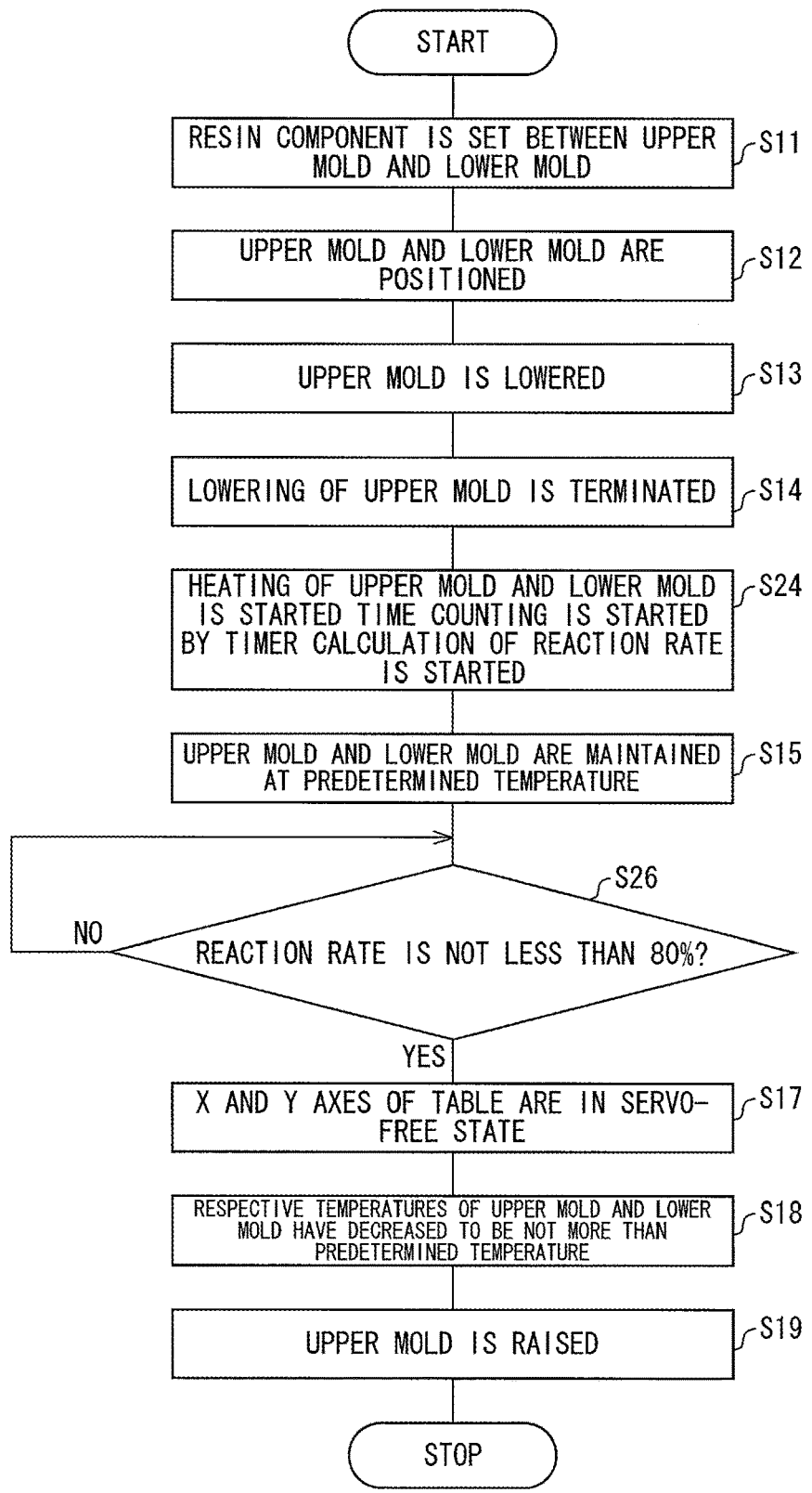
FIG. 14 shows a flow of a process carried out by the molding apparatus in accordance with the second embodiment.

Next, a flow of a process carried out by the molding apparatus unit 5 is described below. FIG. 14 shows the flow of the process carried out by the molding apparatus unit 5.

Processes of steps S11 through S14 are carried out as in the case of those of FIG. 8, and lowering of the upper mold MU is terminated at step S14.

Then, the temperature control section 31 starts heating the upper mold MU and the lower mold ML by driving the respective heat sources of the upper mold holding section 8 and the table 9. When the temperature control section 31 obtains temperature information from each of the respective heat sources of the upper mold holding section 8 and the table 9, the temperature control section 31 supplies the obtained temperature information to the transmission and reception section 23. The timer 25 starts time counting at the time when the temperature control section 31 starts heating the respective heat sources of the upper mold holding section 8 and the table 9. Then, the timer 25 supplies a counted elapsed time to the transmission and reception section 23.

The transmission and reception section 51 supplies, to the heating value calculation section 53, the temperature information and the elapsed time each supplied from the transmission and reception section 23.

In accordance with the temperature information and the elapsed time each obtained from the transmission and reception section 51, the heating value calculation section 53 calculates the heating value SAM of the resin component W which is being molded. Then, the heating value calculation section 53 supplies the heating value SAM thus calculated to the reaction rate calculation section 54.

When the reaction rate calculation section 54 obtains (i) the heating value SAM obtained from the heating value calculation section 53 and (ii) the heating value REF stored in the memory section 52, the reaction rate calculation section 54 starts calculating the reaction rate based on Equation 1 (described earlier) (step S24).

When the temperature control section 31 obtains temperature information obtained from each of the respective heat sources of the upper mold holding section 8 and the table 9 and a temperature indicated by the temperature information reaches a predetermined constant temperature, the temperature control section 31 controls driving of the respective heat sources of the upper mold holding section 8 and the table 9 so that the upper mold MU and the lower mold ML have the predetermined constant temperature. The upper mold MU and the lower mold ML are thus heated to and maintained at the predetermined constant temperature (step S15).

Then, the heating value SAM of the resin component W increases, the heating value SAM being calculated by the heating value calculation section 53. Thereafter, the reaction rate calculation section 54 determines, by determining whether or not the resin component W has a reaction rate of not less than 80%, whether or not the resin component W has reached the curing point P (step S26).

When the reaction rate calculation section 54 determines that the resin component W has a reaction rate of not less than 80%, the reaction rate calculation section 54 supplies, to the transmission and reception section 51, servo-free instruction information that the curing point has been detected. Then, the transmission and reception section 51 supplies the servo-free instruction information to the transmission and reception section 23. The transmission and reception section 23 supplies, to the motor control section 21, the servo-free instruction information obtained from the transmission and reception section 51. When the motor control section 21 obtains the servo-free instruction information from the transmission and reception section 23, the motor control section 21 releases the retaining force of the servomotors 12a and 13a so as to cause the X and Y axes of the table 9 to be in a servo-free state (step S17).

After processes of steps S18 and S19 are carried out, the resin component W which has been molded is completed. This allows the completed resin component W to be taken out of the upper mold MU and the lower mold ML.

According to this, it is possible to obtain a molded product while preventing positional displacement caused by a reduction in volume of the resin component W which is being cured.

Note that the description of the present embodiment assumes that the DSC device 50 is provided on an outside of the molding apparatus 1a. However, how to provide the DSC device 50 is not limited to this. The DSC device 50 may be provided in the control section 20a of the molding apparatus 1a.

Third Embodiment

Next, a third embodiment of the present invention is described below with reference to FIGS. 15 through 17. Note that, for convenience, members having functions identical to those of the respective members illustrated in the drawings of the First and Second Embodiments are given respective identical reference numerals, and a description of those members is omitted here.

Figure 15:
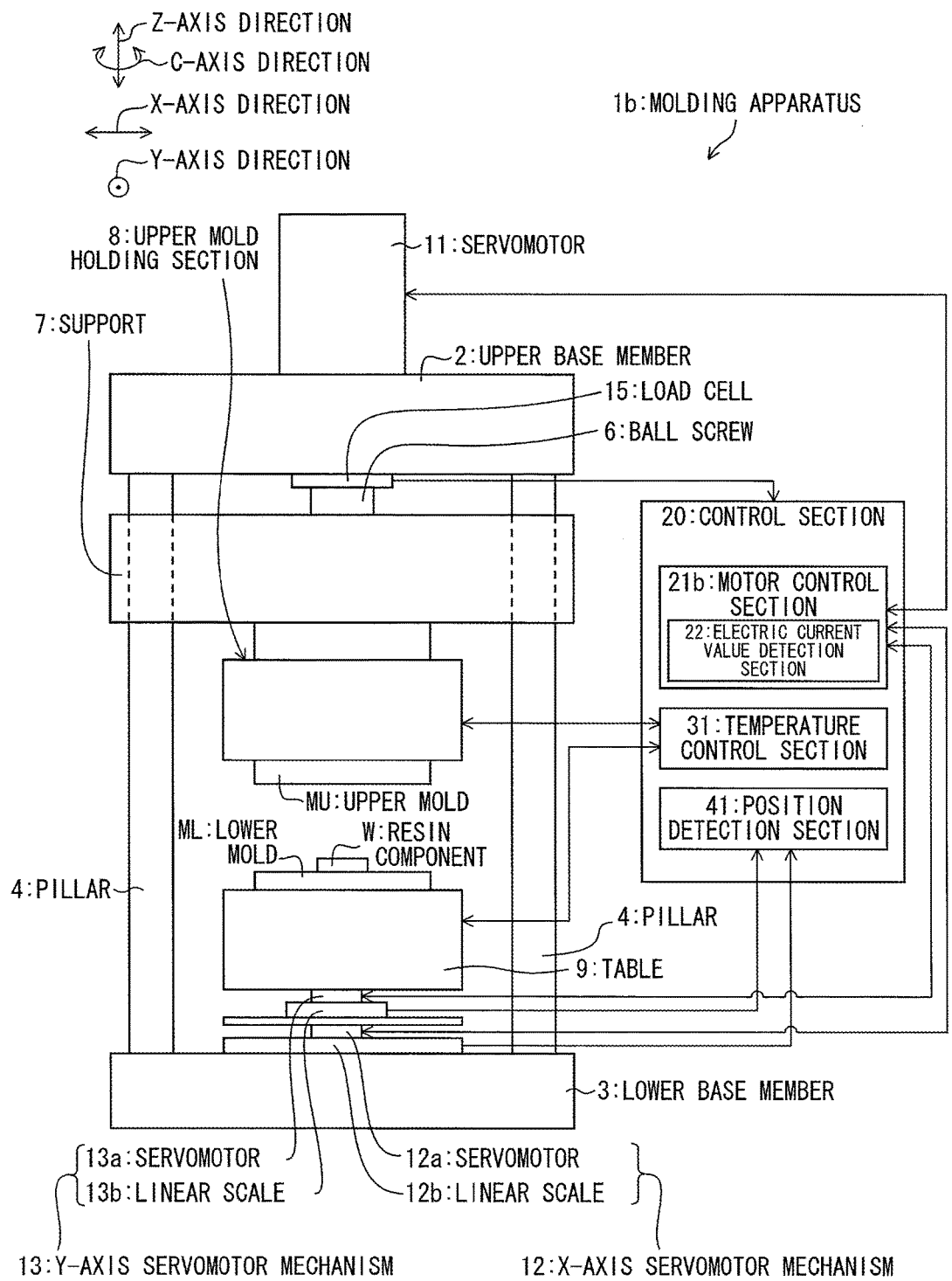
FIG. 15 illustrates a configuration of a molding apparatus in accordance with a third embodiment.

FIG. 15 illustrates a configuration of a molding apparatus 1b in accordance with the third embodiment.

The molding apparatus 1b differs from the molding apparatus 1 in that the molding apparatus 1b includes a motor control section 21b instead of the motor control section 21. The other configuration of the molding apparatus 1b is similar to that of the molding apparatus 1.

The motor control section 21b is obtained by causing the motor control section 21 to include an electric current value detection section (curing determination section) 22.

The electric current value detection section 22 determines, while a resin component W is being molded, whether or not the resin component W has reached a curing point P. By determining whether or not an electric current value applied to each of servomotors 12a and 13a has exceeded a predetermined given value, the electric current value detection section 22 determines whether or not the resin component W has reached the curing point P while being molded.

When the electric current value detection section 22 determines that an electric current value applied to each of servomotors 12a and 13a has exceeded a predetermined given value, the electric current value detection section 22 considers that the resin component W has reached the curing point P. The motor control section 21 releases a retaining force of the servomotors 12a and 13a so as to cause X and Y axes of a table 9 to be in a servo-free state.

Figure 16:
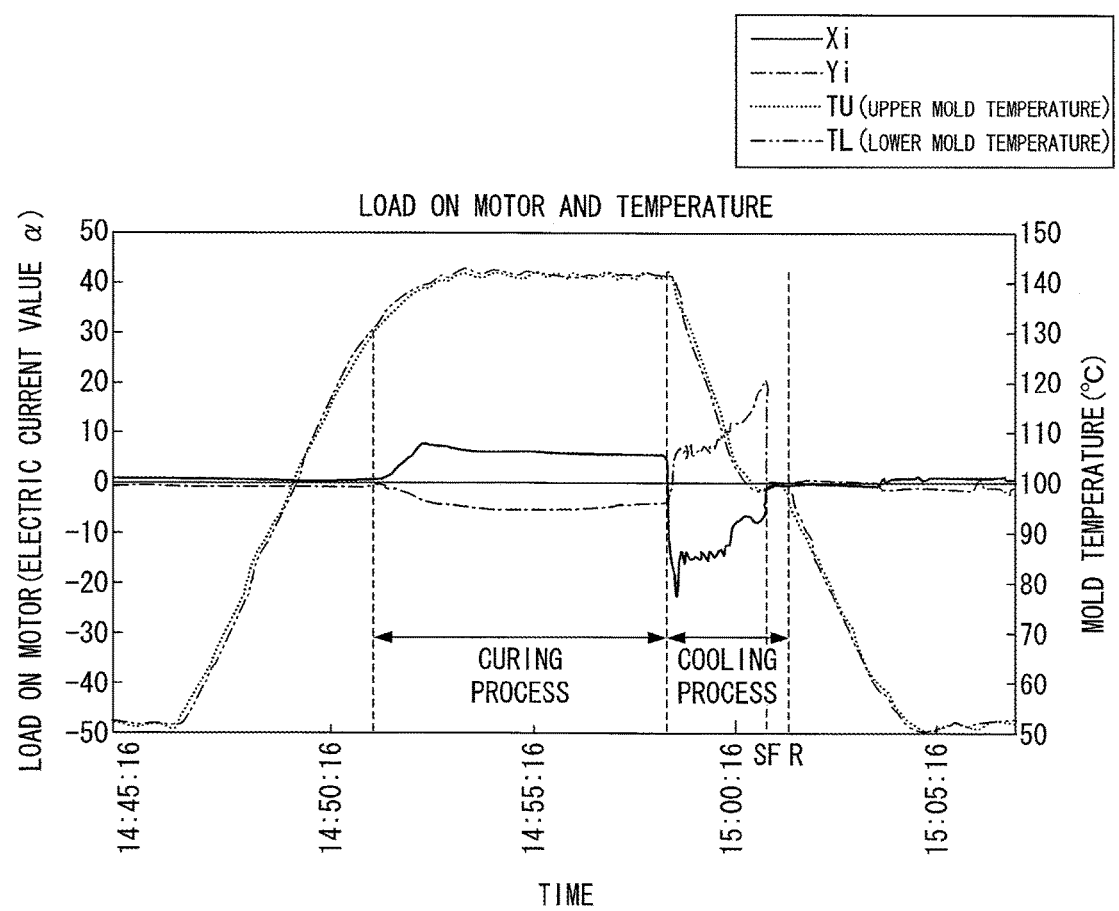
FIG. 16 shows loads applied to respective motors on X and Y axes of the molding apparatus.

FIG. 16 shows loads applied to respective motors on X and Y axes of the molding apparatus 1. In FIG. 16, "Xi" indicates a load to be applied to the servomotor 12a on the X-axis, "Yi" indicates a load to be applied to the servomotor 13a on the Y-axis, "TU" indicates a temperature of an upper mold MU, and "TL" indicates a temperature of a lower mold ML.

In a process for molding the resin component W, it is revealed that "Xi" and "Yi" increase in value in a case where the resin component W starts to be cured after the process enters a curing process and then "TU" and "TL" have a constant temperature of approximately 140° C.

When the process for molding the resin component W subsequently enters a cooling process, "TU" and "TL" decrease in temperature from 140° C. In this case, it is revealed that "Xi" and "Yi" increase in load in a direction reverse to a direction in which "Xi" and "Yi" increase in value in the curing process. In the cooling process, when "Xi" and "Yi" have respective constant values, the electric current value detection section 22 considers that the resin component W has been cured. Then, the motor control section 21b causes the X and Y axes of the table 9 to be in a servo-free state, and causes an electric current value α applied to each of the servomotors 12a and 13a to be substantially 0 (zero) (see a point SF in FIG. 16).

As described in the First Embodiment, as a constant electric current value α which is used by the electric current value detection section 22 to consider that the resin component W has reached the curing point P, it is possible to store, in the electric current value detection section 22, a constant electric current value obtained by associating in advance (i) a moving amount of X-coordinate and Y-coordinate positions of the table 9 and (ii) an electric current value applied to each of servomotors 12a and 13a, the moving amount and the electric current value each being used for a position detection section 41 to determine that the moving amount of the table 9 has reached a minimum value. Alternatively, an electric current value applied before the mold release process is started (an electric current value that is less than an electric current value applied during the mold release) may be stored as a predetermined constant electric current value in the electric current value detection section 22. Alternatively, as described in the Second Embodiment, an electric current value applied to each of the servomotors 12a and 13a when the resin component W has a reaction rate of 80% may be stored as a predetermined constant electric current value in the electric current value detection section 22.

Figure 17:
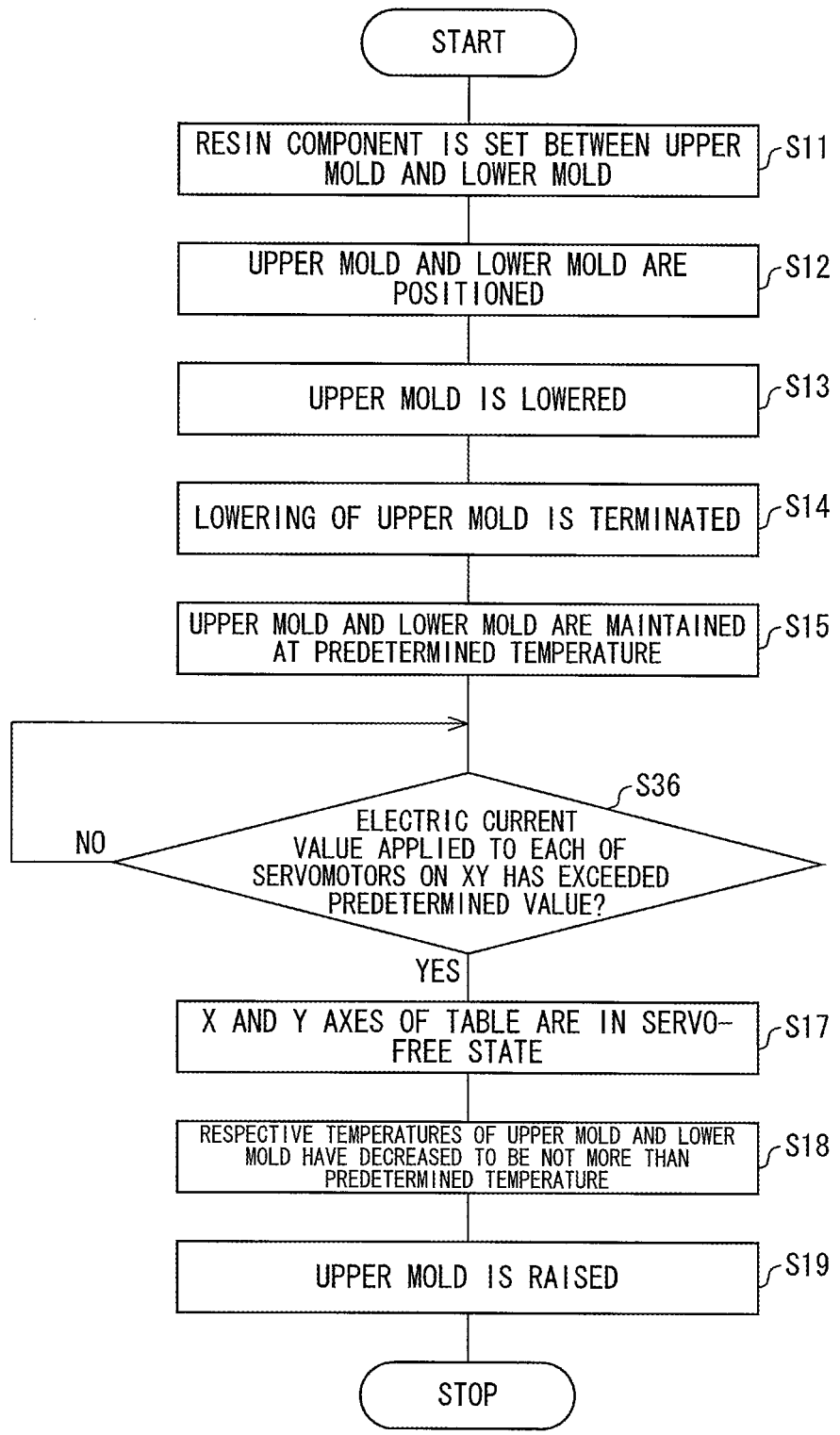
FIG. 17 shows a flow of a process carried out by the molding apparatus in accordance with the third embodiment.

FIG. 17 shows a flow of a process carried out by the molding apparatus unit 1b. Processes of steps S11 through S15 are carried out as in the case of FIG. 8, and at step S15, the upper mold MU and the lower mold ML are heated to and maintained at a predetermined constant temperature (step S15).

Then, curing of the resin component W which is sandwiched between the upper mold MU and the lower mold ML progresses, so that the electric current value detection section 22 determines whether or not the resin component W has reached the curing point P.

That is, the electric current value detection section 22 determines whether or not an electric current value applied to each of the servomotors 12a and 13a has exceeded a predetermined given value (step S36).

When the electric current value detection section 22 determines that an electric current value applied to each of servomotors 12a and 13a has exceeded a predetermined given value (YES at step S36), the motor control section 21 releases the retaining force of the servomotors 12a and 13a so as to cause the X and Y axes of the table 9 to be in a servo-free state (step S17).

After processes of steps S18 and S19 are carried out, the resin component W which has been molded is completed. This allows the completed resin component W to be taken out of the upper mold MU and the lower mold ML.

According to this, it is possible to obtain a molded product while preventing positional displacement caused by a reduction in volume of the resin component W which is being cured.

Fourth Embodiment

Next, a fourth embodiment of the present invention is described below with reference to FIGS. 18 and 19. Note that, for convenience, members having functions identical to those of the respective members illustrated in the drawings of the First through Third Embodiments are given respective identical reference numerals, and a description of those members is omitted here.

Figure 18:
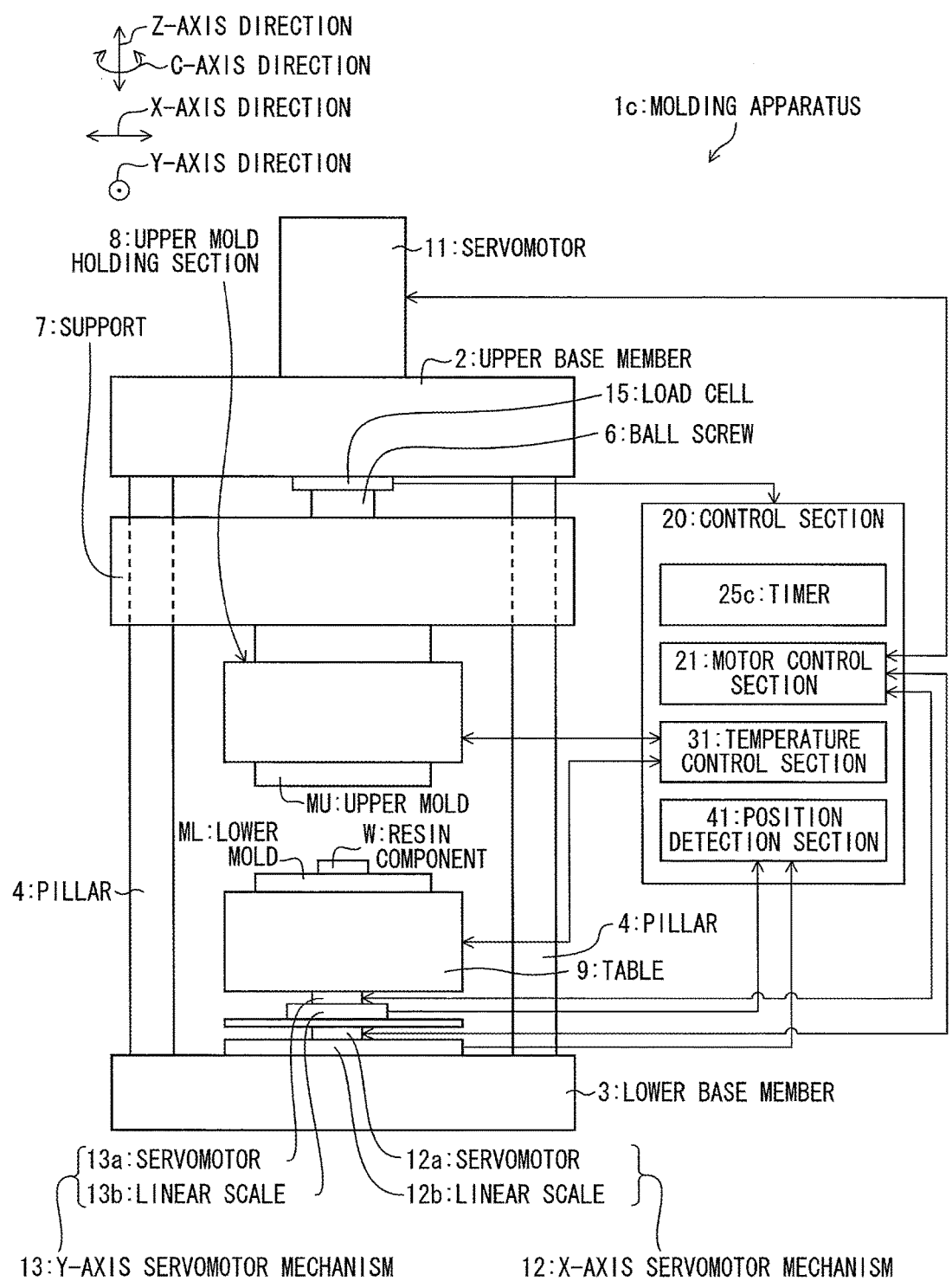
FIG. 18 illustrates a configuration of a molding apparatus in accordance with a fourth embodiment.

FIG. 18 illustrates a configuration of a molding apparatus 1c in accordance with the fourth embodiment.

The molding apparatus 1c differs from the molding apparatus 1 in that the molding apparatus 1c includes a control section 20 including a timer (curing determination section) 25c. The other configuration of the molding apparatus 1c is similar to that of the molding apparatus 1.

The timer 25 determines, while a resin component W is being molded, whether or not the resin component W has reached a curing point P.

A curing point can be determined in advance for each resin material in accordance with a heating temperature and a time. Therefore, assuming that a heating temperature of the resin component W is constant, merely by observing a heating time, it is possible to determine whether or not the resin component W has reached the curing point P.

A temperature to be applied by a temperature control section 31 and a time necessary for the temperature to cause the resin component W to reach the curing point are stored in the timer 25c so that the temperature and the time are associated with each other.

Figure 19:
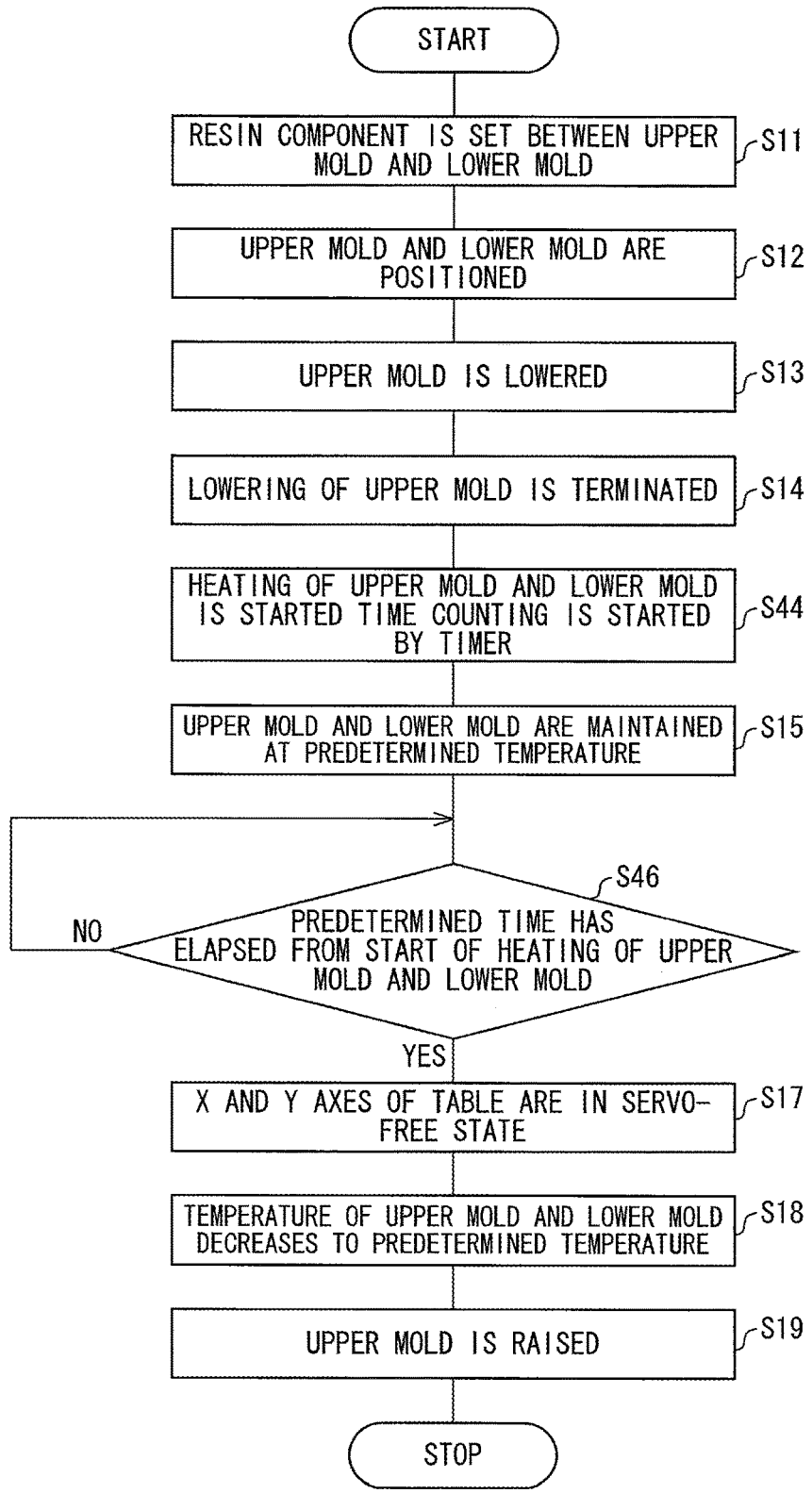
FIG. 19 shows a flow of a process carried out by the molding apparatus in accordance with the fourth embodiment.

FIG. 19 shows a flow of a process carried out by the molding apparatus unit 1c.

Processes of steps S11 through S14 are carried out as in the case of FIG. 8, and lowering of an upper mold MU is terminated at step S14. Next, the temperature control section 31 starts heating the upper mold MU and a lower mold ML by driving respective heat sources of an upper mold holding section 8 and a table 9, and the timer 25c starts time counting (step S44).

When the temperature control section 31 obtains temperature information from each of the respective heat sources of the upper mold holding section 8 and the table 9 and a temperature indicated by the temperature information reaches a predetermined constant temperature, the temperature control section 31 controls driving of the respective heat sources of the upper mold holding section 8 and the table 9 so that the upper mold MU and the lower mold ML have the predetermined constant temperature. The upper mold MU and the lower mold ML are thus heated to and maintained at the predetermined constant temperature (step S15).

Then, curing of the resin component W which is sandwiched between the upper mold MU and the lower mold ML progresses, so that the timer 25c determines whether or not the resin component W has reached the curing point P.

That is, the timer 25c determines whether or not a predetermined given time has elapsed from the start of the heating of the upper mold MU and the lower mold ML (step S46).

When the timer 25c determines, after that a predetermined given time has elapsed from the start of the heating of the upper mold MU and the lower mold ML, the timer 25c supplies, to the motor control section 21, information that the curing point has been detected. When the motor control section 21 detects, from the timer 25c, information that the curing point has been detected, the motor control section 21 releases a retaining force of servomotors 12a and 13a so as to cause X and Y axes of the table 9 to be in a servo-free state (step S17).

After processes of steps S18 and S19 are carried out, the resin component W which has been molded is completed. This allows the completed resin component W to be taken out of the upper mold MU and the lower mold ML.

According to this, it is possible to obtain a molded product while preventing positional displacement caused by a reduction in volume of the resin component W which is being cured.

CONCLUSION

A molding apparatus in accordance with an embodiment of the present invention for molding a resin, includes: an upper mold and a lower mold which are paired metal molds and between which the resin is sandwiched while being molded; a first driving section for pressing the resin by moving the upper mold in a first direction in which the upper mold is made close to the lower mold; and a second driving section which retains a position of the lower mold that is movable in a second direction which intersects the first direction, the second driving section terminating the retention of the position of the lower mold before the resin which is sandwiched between the upper mold and the lower mold is mold-released.

A method in accordance with an embodiment of the present invention for molding a resin, the resin being sandwiched between an upper mold and a lower mold which are paired metal molds, the method includes: pressing the resin by moving the upper mold in a first direction in which the upper mold is made close to the lower mold; retaining a position of the lower mold that is movable in a second direction which intersects the first direction; and terminating the retention of the position of the lower mold before the resin which is sandwiched between the upper mold and the lower mold is mold-released.

According to the configuration, the molding apparatus includes: a first driving section for pressing the resin by moving the upper mold in a first direction in which the upper mold is made close to the lower mold; and a second driving section which retains a position of the lower mold that is movable in a second direction which intersects the first direction. This makes it possible to cure the resin while fixing relative positions of the upper mold and the lower mold. The second driving section terminates the retention of the position of the lower mold before the resin which is sandwiched between the upper mold and the lower mold is mold-released.

This allows the lower mold to move in the second direction before the resin which is sandwiched between the upper mold and the lower mold is mold-released, so that the lower mold follows a position of the upper mold by a pressing force of the upper mold in the first direction even in a case where a decrease in volume of the resin which is being cured may occur. This makes it possible to obtain a molded product while preventing positional displacement caused by a decrease in volume of the resin which is being cured.

A molding apparatus in accordance with an embodiment of the present invention may further include: a curing determination section which determines whether or not the resin which is sandwiched between the upper mold and the lower mold has been cured; a table on which the lower mold is mounted; and a motor for moving the table in the second direction, the curing determination section determining, by detecting a retaining force by which the motor retains the position of the lower mold, and finding that the retaining force has reached a predetermined value after a start of curing of the resin, that the resin which is sandwiched between the upper mold and the lower mold has been cured, and the second driving section terminating the retention of the position of the lower mold.

A molding apparatus in accordance with an embodiment of the present invention may further include: a curing determination section which determines whether or not the resin which is sandwiched between the upper mold and the lower mold has been cured, the curing determination section determining, by finding that a predetermined time has elapsed from a start of curing of the resin, that the resin which is sandwiched between the upper mold and the lower mold has been cured, and the second driving section terminating the retention of the position of the lower mold.

A molding apparatus unit in accordance with an embodiment of the present invention may include: a molding apparatus mentioned above; and a curing determination section which determines whether or not the resin which is sandwiched between the upper mold and the lower mold has been cured, the curing determination section determining, by finding that a heating value of the resin which is sandwiched between the upper mold and the lower mold has exceeded a predetermined value, that the resin which is sandwiched between the upper mold and the lower mold has been cured, and the second driving section terminating the retention of the position of the lower mold.

As described earlier, when the curing determination section determines that the resin which is sandwiched between the upper mold and the lower mold has been cured, the second holding section terminates the retention of the position of the lower mold. This makes it possible to obtain a molded product while preventing positional displacement caused by a decrease in volume of the resin which is being cured.

A molding apparatus in accordance with an embodiment of the present invention may further include: a curing determination section which determines whether or not the resin which is sandwiched between the upper mold and the lower mold has been cured; and a table on which the lower mold is mounted, the curing determination section determining, by detecting a position of the table in the second direction, and finding that a moving amount per unit time of the table has reached a minimum value after a start of curing of the resin, that the resin which is sandwiched between the upper mold and the lower mold has been cured. This also makes it possible to obtain a molded product while preventing positional displacement caused by a decrease in volume of the resin which is being cured.

The present invention is not limited to the description of the embodiments above, but may be altered by a skilled person within the scope of the claims. An embodiment based on a proper combination of technical means disclosed in different embodiments is encompassed in the technical scope of the present invention.

INDUSTRIAL APPLICABILITY

The present invention, which makes it possible to control X and Y driving axes while a resin is being cured, is applicable to a molding apparatus and a molding method in each of which highly elaborate processing accuracy is required, and is also widely applicable to a general molding apparatus and a general molding method.

REFERENCE SIGNS LIST 1, 1a, 1b, 1c Molding apparatus
5 Molding apparatus unit
6 Ball screw
8 Upper mold holding section
9 Table
11 Servomotor (First driving section)
12a, 13a Servomotor (Second driving section)
12b, 13b Linear scale
15 Load cell
20 Control section 21 Motor control section
21b Motor control section
22 Electric current value detection section (Curing determination section)
25 Timer
25c Timer (Curing determination section)
31 Temperature control section
41 Position detection section (Curing determination section)
50 DSC device
51 Transmission and reception section
52 Memory section
53 Heating value calculation section
54 Reaction rate calculation section (curing determination section)
ML Lower mold
MU Upper mold
P Curing point
R Mold release point
W Resin component

The invention claimed is:

1. A method of driving a molding apparatus for molding a resin,
the molding apparatus comprising:
an upper mold and a lower mold which comprise paired metal molds and between which the resin is sandwiched while being molded;
a table on which the lower mold is mounted; and
a motor configured to move the table;
the method comprising:
moving the upper mold in a first direction in which the upper mold is made close to the lower mold;
the motor moving the table on which the lower mold is mounted, in a second direction which is in a plane perpendicular to the first direction, to a retention position;
retaining the lower mold in the retention position with respect to the second direction while an electric current is being applied to the motor and until the resin reaches a curing point; and thereafter
releasing the lower mold from the retention position with respect to the second direction when the electric current stops being applied to the motor to prevent positional displacement caused by a decrease in volume of the resin which is being cured before the resin which is sandwiched between the upper mold and the lower mold is mold-released.

2. The method as set forth in claim 1,
wherein the molding apparatus further comprises:
wherein the method further comprises:
a curing determining step of determining whether or not the resin which is sandwiched between the upper mold and the lower mold has been cured,
wherein in the second driving step, the retention of the position of the lower mold is terminated in a case where, in the curing determining step, it is determined, by detecting a retaining force by which the motor retains the position of the lower mold, and by finding that the retaining force has reached a predetermined value after a start of curing of the resin, that the resin which is sandwiched between the upper mold and the lower mold has been cured.

3. The method as set forth in claim 1, further comprising:
a curing determining step of determining whether or not the resin which is sandwiched between the upper mold and the lower mold has been cured,
wherein in the second driving step, the retention of the position of the lower mold is terminated in a case where, in the curing determining step, it is determined, by finding that a predetermined time has elapsed from a start of curing of the resin, that the resin which is sandwiched between the upper mold and the lower mold has been cured.

4. The method as set forth in claim 1, further comprising;
a curing determining step of determining whether or not the resin which is sandwiched between the upper mold and the lower mold has been cured,
wherein in the second driving step, the retention of the position of the lower mold is terminated in a case where, in the curing determining step, it is determined, by finding that a heating value of the resin which is sandwiched between the upper mold and the lower mold has exceeded a predetermined value, that the resin which is sandwiched between the upper mold and the lower mold has been cured.

* * * * *